US009617898B2

United States Patent
Bisaiji

(10) Patent No.: US 9,617,898 B2
(45) Date of Patent: Apr. 11, 2017

(54) CONTROL SYSTEM OF INTERNAL COMBUSTION ENGINE

(71) Applicant: TOYOTA JIDOSHA KABUSHIKI KAISHA, Toyota-shi, Aichi (JP)

(72) Inventor: Yuki Bisaiji, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/782,882

(22) PCT Filed: Apr. 8, 2013

(86) PCT No.: PCT/JP2013/060646
§ 371 (c)(1),
(2) Date: Oct. 7, 2015

(87) PCT Pub. No.: WO2014/167635
PCT Pub. Date: Oct. 16, 2014

(65) Prior Publication Data
US 2016/0053656 A1  Feb. 25, 2016

(51) Int. Cl.
*F01N 3/00* (2006.01)
*F01N 11/00* (2006.01)
*F01N 3/08* (2006.01)

(52) U.S. Cl.
CPC .......... *F01N 11/002* (2013.01); *F01N 3/0814* (2013.01); *F01N 3/0821* (2013.01); *F01N 3/0842* (2013.01); *F01N 11/00* (2013.01); *F01N 2240/30* (2013.01); *F01N 2550/05* (2013.01); *F01N 2610/03* (2013.01); *F01N 2610/1493* (2013.01); *F01N 2900/1602* (2013.01); *F01N 2900/1808* (2013.01); *Y02T 10/47* (2013.01)

(58) Field of Classification Search
USPC .................. 60/277, 286, 295, 297, 301, 303
See application file for complete search history.

(56) References Cited

U.S. PATENT DOCUMENTS 7,607,292 B2 * 10/2009 Kobayashi ............ F01N 3/0253
     60/280
7,963,105 B2 * 6/2011 Tagawa ..................... F01N 3/36
     60/277

(Continued)

FOREIGN PATENT DOCUMENTS

JP    2008-002426    1/2008
JP    2008-267178    11/2008

*Primary Examiner* — Binh Q Tran
(74) *Attorney, Agent, or Firm* — Finnegan, Henderson, Farabow, Garrett & Dunner, LLP

(57) ABSTRACT

An internal combustion engine, wherein a hydrocarbon supply valve (15) and an exhaust gas purification catalyst (13) are disposed inside an engine exhaust gas passage. When an increase in the temperature of the exhaust gas purification catalyst (13) caused by hydrocarbons supplied from the hydrocarbon supply valve (15) is smaller than a predetermined increase amount, and a decrease in the pressure of fuel supplied to the hydrocarbon supply valve (15) when the hydrocarbons have been injected from the hydrocarbon supply valve (15) is larger than a predetermined decrease amount, the present invention determines that a blockage is occurring in a hydrocarbon injection channel (69) when the hydrocarbons have been injected from the hydrocarbon supply valve (15).

10 Claims, 16 Drawing Sheets

(56) References Cited

U.S. PATENT DOCUMENTS

| | | | | |
|---|---|---|---|---|
| 8,209,959 B2* | 7/2012 | Yamamoto | ............ | F01N 3/0253 |
| | | | | 60/286 |
| 8,209,964 B2* | 7/2012 | Kesse | ................... | F01N 3/2066 |
| | | | | 60/295 |
| 8,915,062 B2* | 12/2014 | Wang | ...................... | F01N 3/208 |
| | | | | 60/274 |
| 8,919,108 B2* | 12/2014 | Itoh | ....................... | F01N 3/0256 |
| | | | | 60/286 |
| 2008/0276601 A1 | 11/2008 | Katou et al. | | |

* cited by examiner

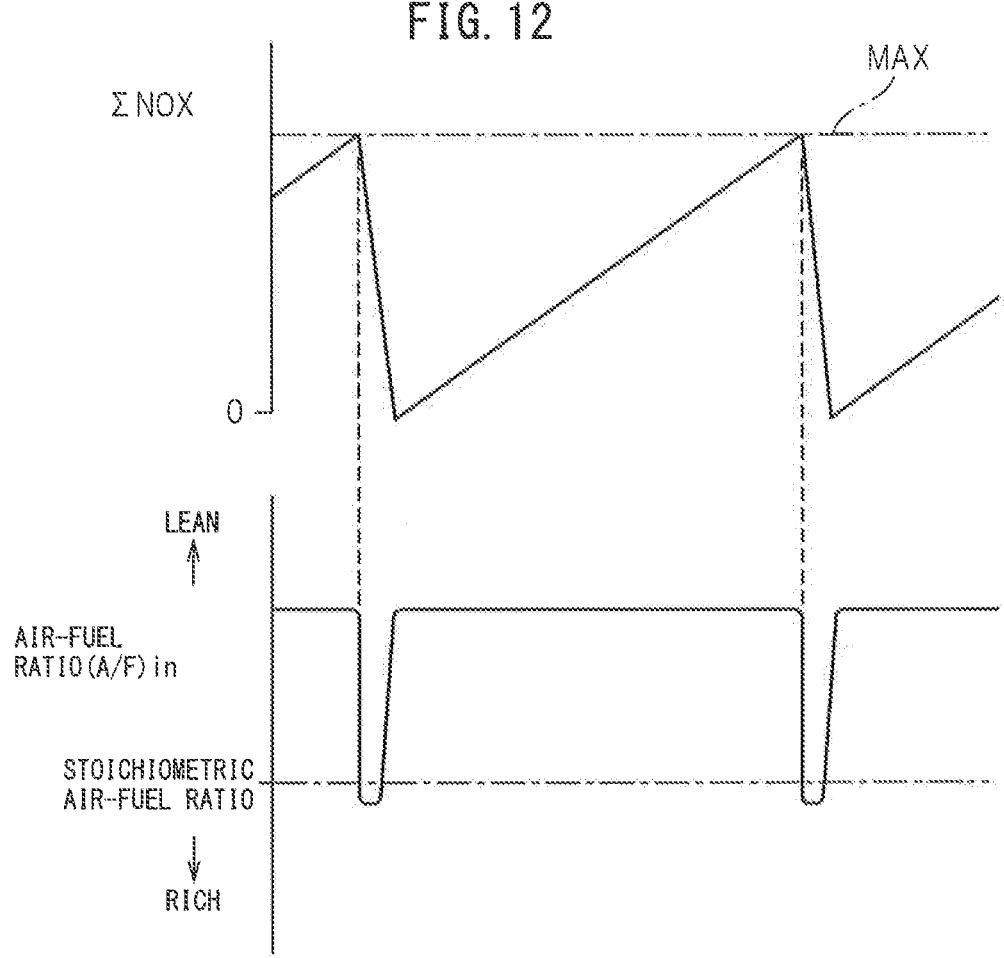
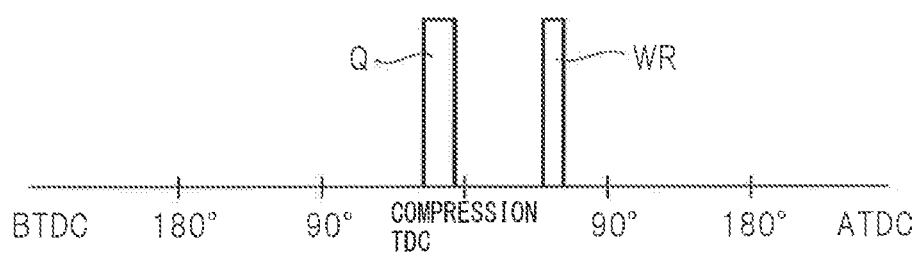

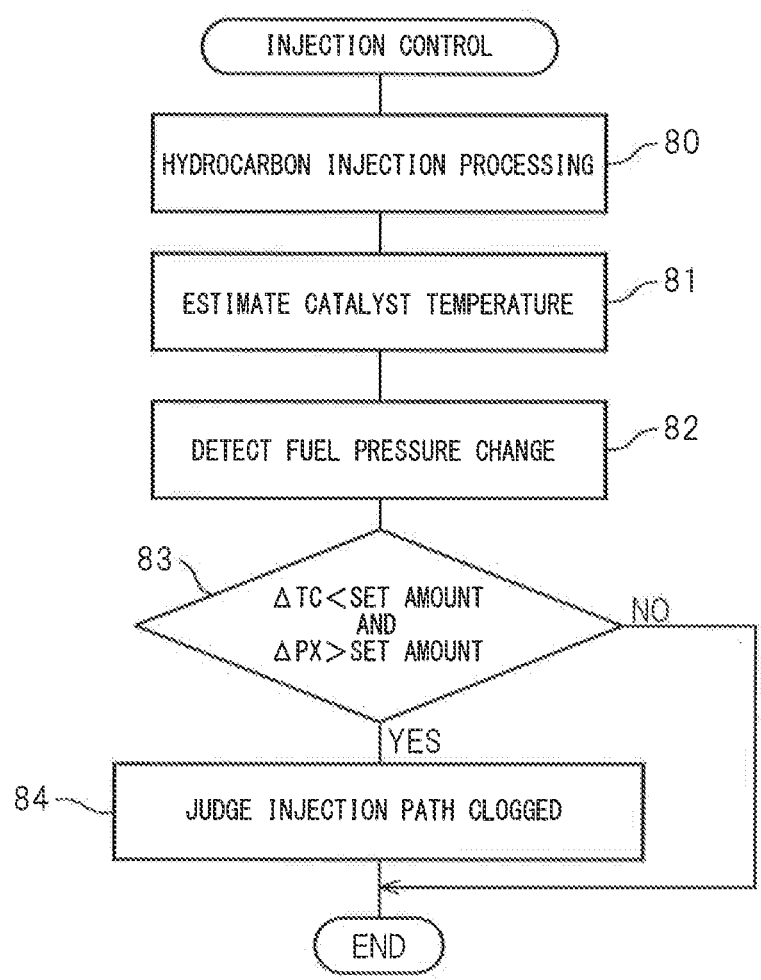

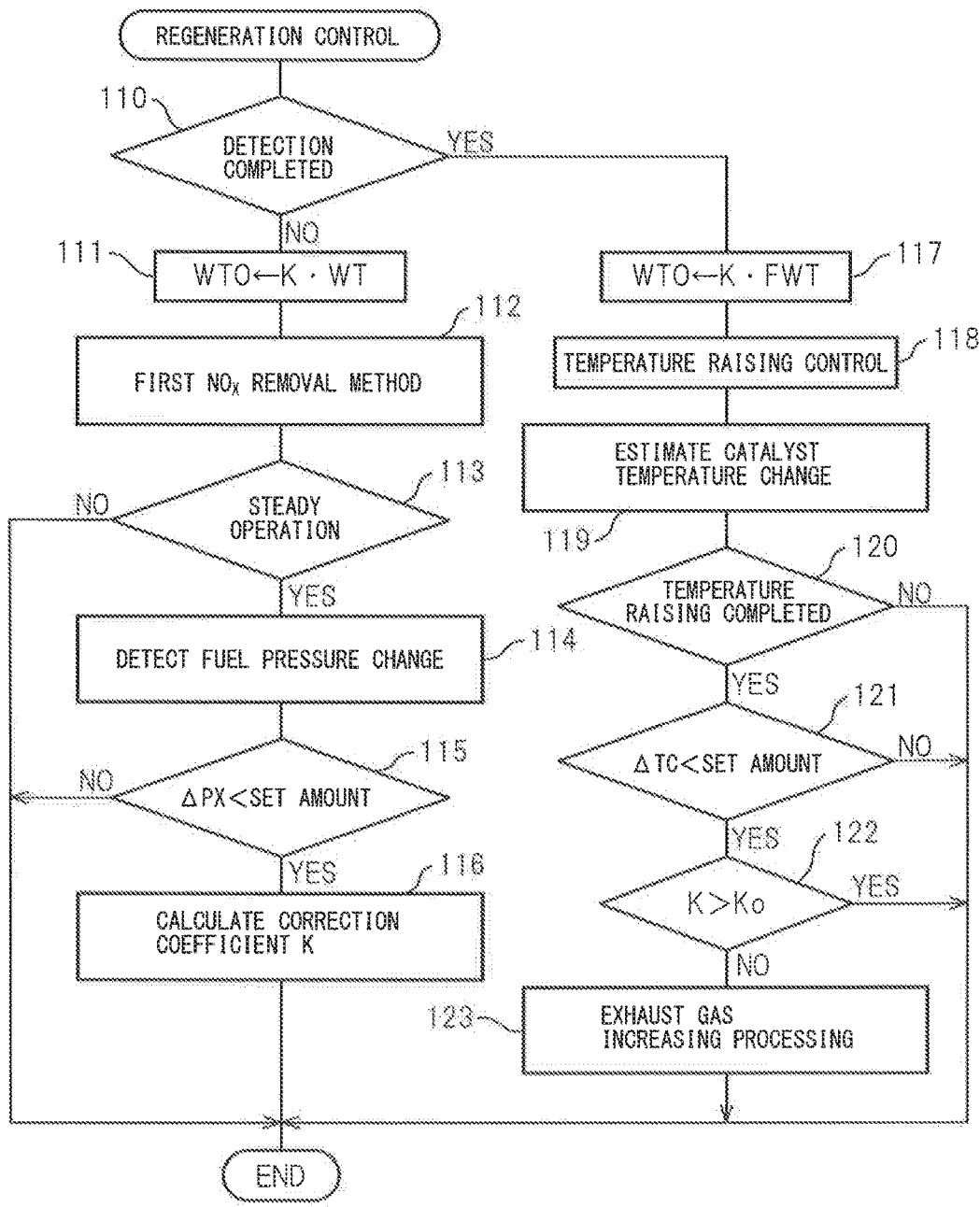

CONTROL SYSTEM OF INTERNAL COMBUSTION ENGINE

TECHNICAL FIELD

The present invention relates to a control system of an internal combustion engine.

BACKGROUND ART

Known in the art is an internal combustion engine which is comprised of a particulate filter which is arranged inside of an engine exhaust passage, a fuel addition valve which is arranged in the engine exhaust passage upstream of the particulate filter, and a temperature sensor for detecting a temperature of the particulate filter and which, when the particulate filter should be regenerated, injects fuel from the fuel addition valve and uses the heat of oxidation reaction of the injected fuel to make the temperature of the particulate filter rise to a 600° C. or so regeneration temperature. In this regard, if the fuel addition valve is clogged, even if the fuel addition valve injects fuel, the temperature of the particulate filter will no longer rise to the regeneration temperature. Therefore, in this internal combustion engine, when the temperature of the particulate filter does not rise to the regeneration temperature even if injecting fuel from the fuel addition valve, it is judged that the fuel addition valve is clogged (for example, see PTL 1).

CITATION LIST

Patent Literature

PTL 1: Japanese Patent Publication No. 2008-267178A

SUMMARY OF INVENTION

Technical Problem

In this regard, sometimes when the fuel addition valve injects fuel along the injection path, the injected fuel deposits on the inside wall surfaces of the exhaust passage around the injection path, exhaust particulate which is contained in the exhaust gas builds up on this deposited fuel, and as a result the injection path is clogged. In this case, for example even if the fuel addition valve injects fuel to raise the temperature of the particulate filter, the injected fuel deposits on the built up exhaust particulate and, as a result, a sufficient injected fuel is no longer fed to the particulate filter. Therefore, in this case, even if the fuel addition valve is not clogged, the temperature of the particulate filter no longer rises to the regeneration temperature. However, in the above internal combustion engine, even if the fuel addition valve is not clogged, it is judged that the fuel addition valve is clogged.

An object of the present invention is to provide a control system of an internal combustion engine which enables accurate judgment of an injection path clogging or a fuel addition valve clogging.

Solution to Problem

According to the present invention, there is provided a control system of an internal combustion engine comprising:
an exhaust purification catalyst arranged in an engine exhaust passage,
a hydrocarbon feed valve arranged in the engine exhaust passage upstream of the exhaust purification catalyst, and
a fuel feed device for feeding fuel to the hydrocarbon feed valve, hydrocarbons being injected from the hydrocarbon feed valve into an exhaust gas along a predetermined injection path, fuel pressure of fuel which is fed to the hydrocarbon feed valve falling when hydrocarbons are injected from the hydrocarbon feed valve,
wherein when a temperature rise of the exhaust purification catalyst due to the hydrocarbons fed from the hydrocarbon feed valve is smaller than a predetermined rise and a drop of the fuel pressure of fuel fed to the hydrocarbon feed valve is larger than a predetermined drop, it is judged that the injection path is clogged.

Further, according to the present invention, there is provided, a control system of an internal combustion engine comprising:
an exhaust purification catalyst arranged in an engine exhaust passage,
a hydrocarbon feed valve arranged in the engine exhaust passage upstream of the exhaust purification catalyst, and
a fuel feed device for feeding fuel to the hydrocarbon feed valve, hydrocarbons being injected from the hydrocarbon feed valve into an exhaust gas along a predetermined injection path, fuel pressure of fuel which is fed to the hydrocarbon feed valve falling when hydrocarbons are injected from the hydrocarbon feed valve,
wherein when a temperature rise of the exhaust purification catalyst due to the hydrocarbons fed from the hydrocarbon feed valve is smaller than a predetermined rise and a drop of the fuel pressure of fuel fed to the hydrocarbon feed valve is smaller than a predetermined drop, it is judged that the hydrocarbon feed valve is clogged.

Advantageous Effects of Invention

In a first aspect of the present invention, it is possible to accurately judge that the injection path of hydrocarbons from the hydrocarbon feed valve is clogged, while in a second aspect of the present invention, it is possible to accurately judge that the hydrocarbon feed valve is clogged.

BRIEF DESCRIPTION OF DRAWINGS

FIG. 12 is a view which shows an $NO_X$ release control.

FIG. 13 is a view which shows a fuel injection timing.

FIG. 18 is a flow chart for performing an injection control.

FIG. 21 is a flow chart for performing a regeneration control.

DESCRIPTION OF EMBODIMENTS

Figure 1:
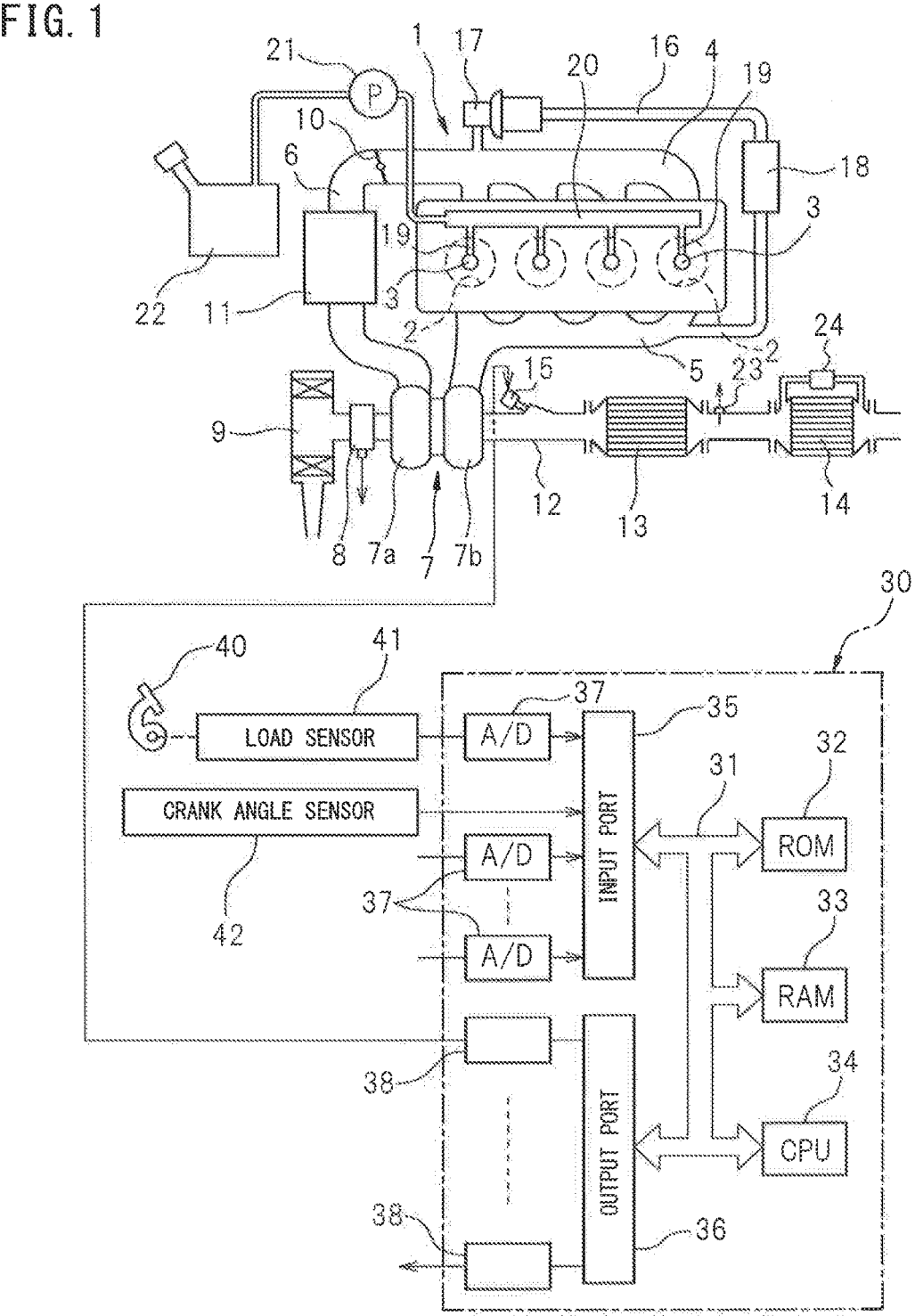
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 which is driven by an actuator is arranged. Around the intake duct 5, a cooling device 11 is arranged for cooling the intake air which flows through the inside of the intake duct 6. In the embodiment which is shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7, and an outlet of the exhaust turbine 7b is connected through an exhaust pipe 12 to an inlet of an exhaust purification catalyst 13. In an embodiment of the present invention, this exhaust purification catalyst 13 is comprised of an $NO_X$ storage catalyst 13. An outlet of the exhaust purification catalyst 13 is connected to a particulate filter 14 and, upstream of the exhaust purification catalyst 13 inside the exhaust pipe 12, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling the EGR gas which flows through the inside of the EGR passage 16. In the embodiment which is shown in FIG. 1, the engine cooling water is guided to the inside of the cooling device 118 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 21 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 23 is arranged for detecting the temperature of the exhaust gas flowing out from the exhaust purification catalyst 13, and a differential pressure sensor 24 for detecting the differential pressure before and after the particulate filter 14 is attached to the particulate filter 14. The output signals of these temperature sensor 23, differential pressure sensor 24 and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, the actuator for driving the throttle valve 10, hydrocarbon feed valve 15, EGR control valve 17, and fuel pump 21.

Figure 2:
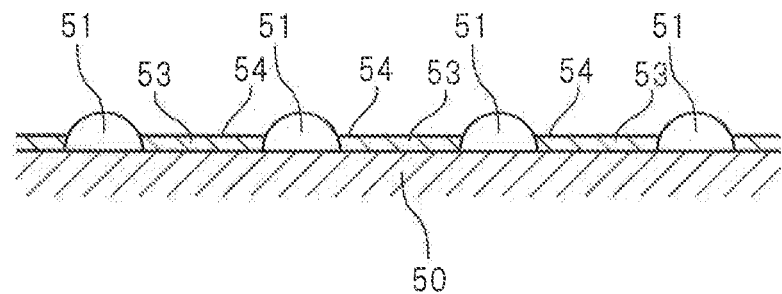
FIG. 2 is a view which schematically shows the surface part of a catalyst carrier.

FIG. 2 schematically shows a surface part of a catalyst carrier which is carried on a substrate of the exhaust purification catalyst 13 shown in FIG. 1. At this exhaust purification catalyst 13, as shown in FIG. 2, for example, there is provided a catalyst carrier 50 made of alumina on which precious metal catalysts 51 comprised of platinum Pt are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanide or another such rare earth and silver Ag, copper Cu, iron Fe, iridium Ir, or another metal able to donate electrons to $NO_X$. In this case, on the catalyst carrier 50 of the exhaust purification catalyst 13, in addition to platinum Pt, rhodium Rh or palladium Pd may be further carried. Note that the exhaust gas flows along the top of the catalyst carrier 50, so the precious metal catalysts 51 can be said to be carried on the exhaust gas flow surfaces of the exhaust purification catalyst 13. Further, the surface of the basic layer 53 exhibits basicity, so the surface of the basic layer 53 is called the "basic exhaust gas flow surface parts 54".

Figure 3:
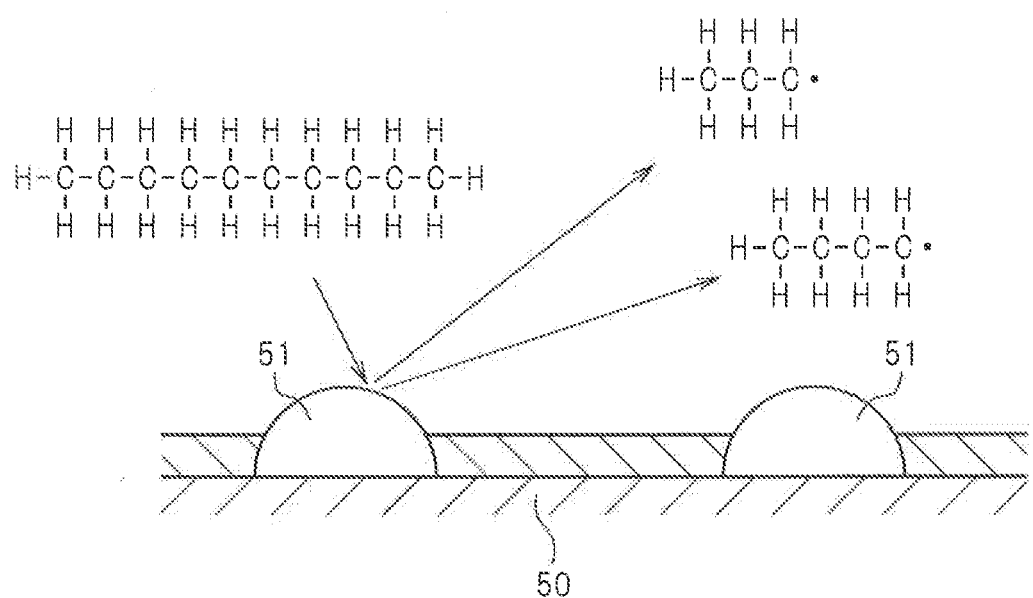
FIG. 3 is a view for explaining an oxidation reaction at an exhaust purification catalyst

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_X$ at the exhaust purification catalyst 13. FIG. 3 schematically shows the reformation action performed at the exhaust purification catalyst 13 at this time. As shown in FIG. 3, the hydrocarbons HC which are injected from the hydrocarbon feed valve 15 become radical hydrocarbons HC with a small carbon number due to the precious metal catalyst 51.

Figure 4:
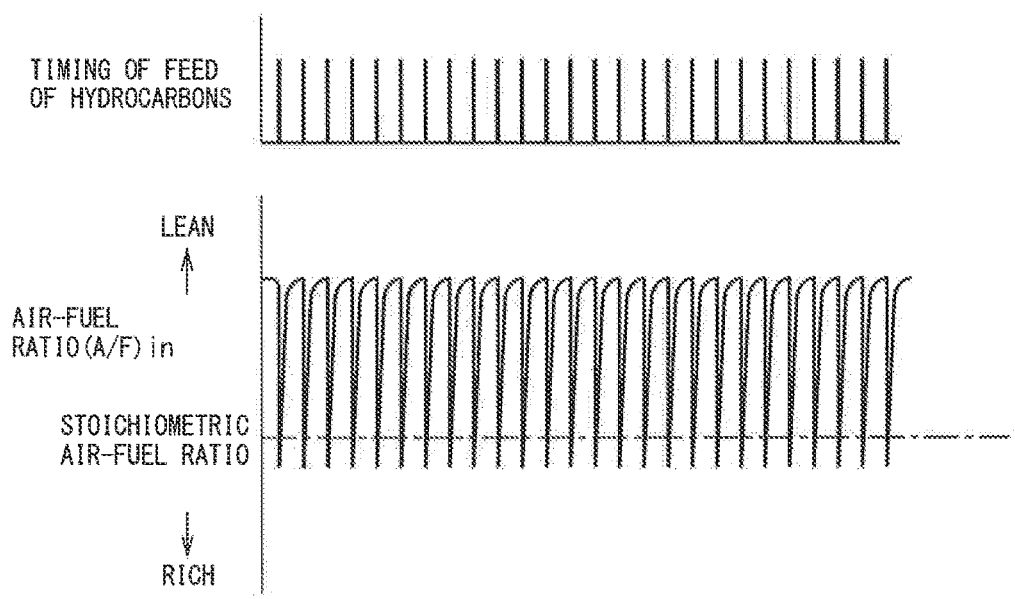
FIG. 4 is a view which shows changes in an air-fuel ratio of exhaust gas which flows into an exhaust purification catalyst.

FIG. 4 shows the feed timing of hydrocarbons from the hydrocarbon feed valve 15 and the change in the air-fuel ratio (A/F) in of the exhaust gas which flows into the exhaust purification catalyst 13. Not that, the change in the air-fuel ratio (A/F) depends on the change in concentration of the hydrocarbons in the exhaust gas which flows into the exhaust purification catalyst 13, so it can be said that the change in the air-fuel ratio (A/F) in shown in FIG. 4 expresses the change in concentration of the hydrocarbons. However, if the hydrocarbon concentration becomes higher, the air-fuel ratio (A/F) in becomes smaller, so, in FIG. 4, the more to the rich side the air-fuel ratio (A/F) in becomes, the higher the hydrocarbon concentration.

Figure 5:
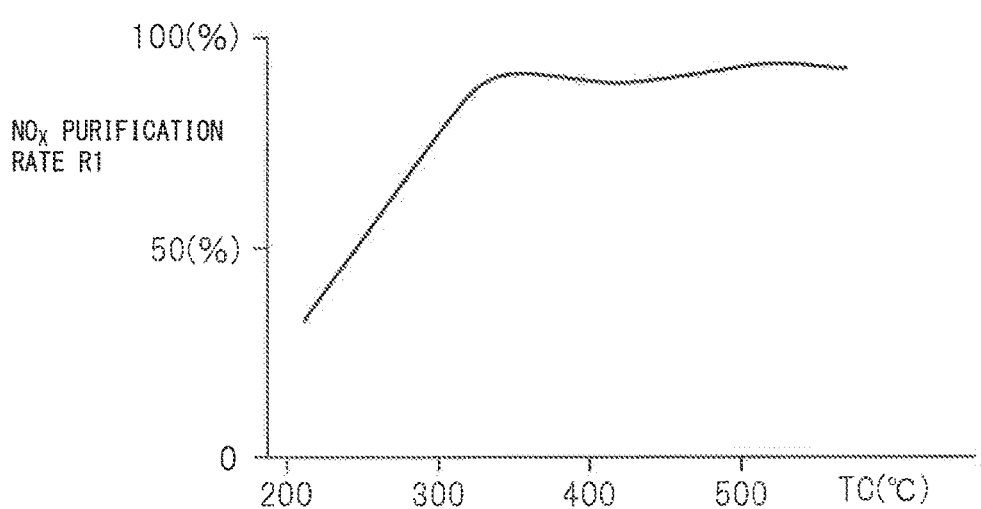
FIG. 5 is a view which shows an $NO_X$ purification rate R1.

FIG. 5 shows the $NO_X$ purification rate R1 by the exhaust purification catalyst 13 with respect to the catalyst temperatures TC of the exhaust purification catalyst 13 when periodically making the concentration of hydrocarbons which flow into the exhaust purification catalyst 13 change so as to as shown in FIG. 4, periodically make the air-fuel ratio (A/F) in of the exhaust gas flowing to the exhaust purification catalyst 13 rich. In this regard, as a result of a research relating to $NO_X$ purification for a long time, it is learned that if making the concentration of hydrocarbons which flow into the exhaust purification catalyst 13 vibrate within a predetermined range of amplitude and within a predetermined range of period, as shown in FIG. 5, an extremely high $NO_X$ purification rate R1 is obtained even in a 350° C. or higher high temperature region.

Figure 6A:
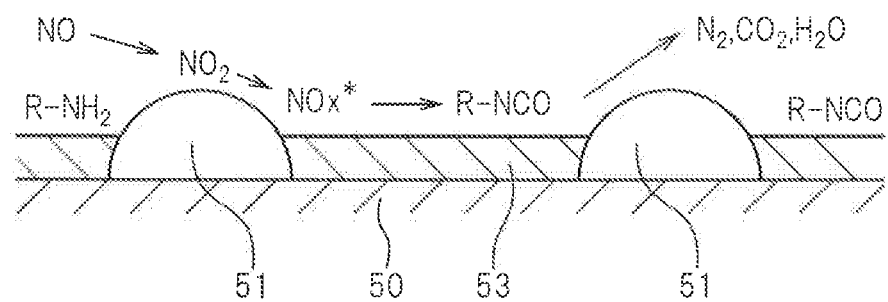
FIGS. 6A and 6B are views for explaining an oxidation reduction reaction in an exhaust purification catalyst.
Figure 6B:
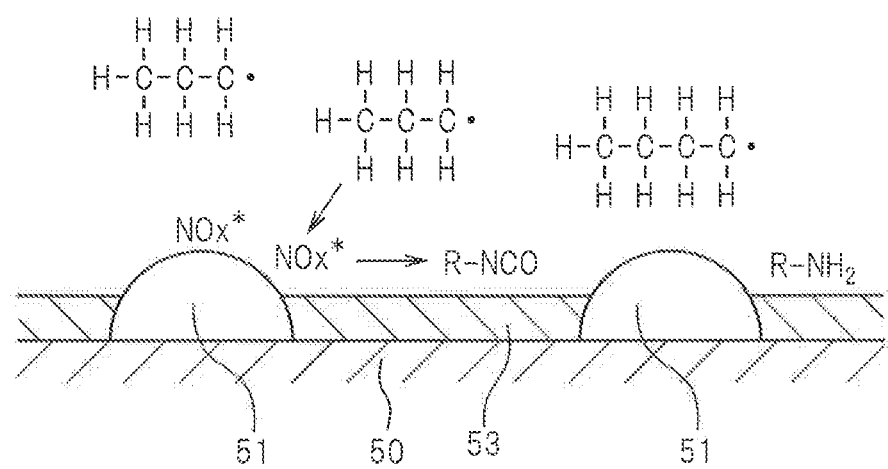

Furthermore, it is learned that at this time, a large amount of reducing intermediates which contain nitrogen and hydrocarbons continues to be held or adsorbed on the surface of the basic layer 53, that is, on the basic exhaust gas flow surface parts 54 of the exhaust purification catalyst 13, and the reducing intermediates play a central role in obtaining a high $NO_X$ purification rate R1. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons which flow into the exhaust purification catalyst 13 is made to vibrate within a predetermined range of amplitude and within a predetermined range of period.

FIG. 6A shows when the concentration of hydrocarbons which flow into the exhaust purification catalyst 13 is low, while FIG. 6B shows when hydrocarbons are fed from the hydrocarbon feed valve 15 and the air-fuel ratio (A/F) in of the exhaust gas flowing to the exhaust purification catalyst 13 is made rich, that is, the concentration of hydrocarbons which flow into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. At this time, part of the NO which is contained in the exhaust gas deposits on the exhaust purification catalyst 13, while part of the NO which is contained in the exhaust gas, as shown in FIG. 6A, is oxidized on the platinum 51 and becomes $NO_2$. Next, this $NO_2$ is further oxidized and becomes $NO_3$. Further, part of the $NO_2$ becomes $NO_2^-$. Therefore, on the platinum Pt 51, $NO_2^-$ and $NO_3$ are produced. The NO which is deposited on the exhaust purification catalyst 13 and the $NO_2^-$ and $NO_3$ which are formed on the platinum Pt 51 are strong in activity. Therefore, below, these NO, $NO_2^-$, and $NO_3$ will be referred to as the "active $NO_X^*$".

On the other hand, if hydrocarbons are fed from the hydrocarbon feed valve 15 and the air-fuel ratio (A/F) in of the exhaust gas flowing to the exhaust purification catalyst 13 is made rich, the hydrocarbons successively deposit over the entire exhaust purification catalyst 13. The majority of the deposited hydrocarbons successively react with oxygen and are burned. Part of the deposited hydrocarbons are successively reformed and become radicalized inside of the exhaust purification catalyst 13 as shown in FIG. 3. Therefore, as shown in FIG. 6B, the hydrogen concentration around the active $NO_X^*$ becomes higher. In this regard, if, after the active $NO_X^*$ is produced, the state of a high oxygen concentration around the active $NO_X^*$ continues for a constant time or more, the active $NO_X^*$ is oxidized and is absorbed in the form of nitrate ions $NO_3^-$ inside the basic layer 53. However, if, before this constant time elapses, the hydrocarbon concentration around the active $NO_X^*$ becomes higher, as shown in FIG. 6B, the active $NO_X^*$ reacts on the platinum 51 with the radical hydrocarbons HO to thereby form the reducing intermediates. The reducing intermediates are adhered or adsorbed on the surface of the basic layer 53.

Note that, at this time, the first produced reducing intermediate is considered to be a nitro compound $R-NO_2$. If this nitro compound $R-NO_2$ is produced, the result becomes a nitrile compound R—CN, but this nitrile compound R—CN can only survive for an instant in this state, so immediately becomes an isocyanate compound R—NCO. This isocyanate compound R—NCO becomes an amine compound $R-NH_2$ if hydrolyzed. However, in this case, what is hydrolyzed is considered to be part of the isocyanate compound R—NCO. Therefore, as shown in FIG. 6B, the majority of the reducing intermediates which are held or adsorbed on the surface of the basic layer 53 is believed to be the isocyanate compound R—NCO and amine compound $R-NH_2$.

On the other hand, as shown in FIG. 6B, if the produced reducing intermediates are surrounded by the hydrocarbons HC, the reducing intermediates are blocked by the hydrocarbons HC and the reaction will not proceed any further. In this case, if the concentration of hydrocarbons which flow into the exhaust purification catalyst 13 is lowered and then the hydrocarbons which are deposited around the reducing intermediates will be oxidized and consumed, and thereby the concentration of oxygen around the reducing intermediates becomes higher, the reducing intermediates react with the $NO_X$ in the exhaust gas, react with the active $NO_X^*$, react with the surrounding oxygen, or break down on their own. Due to this, the reducing intermediates R—NCO and $R-NH_2$ are converted to $N_2$, $CO_2$, and $H_2O$ as shown in FIG. 6A, therefore the $NO_X$ is removed.

In this way, in the exhaust purification catalyst 13, when the concentration of hydrocarbons which flow into the exhaust purification catalyst 13 is made higher, reducing intermediates are produced, and after the concentration of hydrocarbons which flow into the exhaust purification catalyst 13 is lowered, when the oxygen concentration is raised, the reducing intermediates react with the $NO_X$ in the exhaust gas or the active $NO_X^*$ or oxygen or break down on their own whereby the $NO_X$ is removed. That is, in order for the exhaust purification catalyst 13 to remove the $No_X$, the concentration of hydrocarbons which flow into the exhaust purification catalyst 13 has to be periodically changed.

Of course, in this case, it is necessary to raise the hydrocarbon concentration to a concentration sufficiently high for producing the reducing intermediates and it is necessary to lower the hydrocarbon concentration to a concentration sufficiently low for making the produced reducing intermediates react with the $NO_X$ in the exhaust gas or the active $NO_X^*$ or oxygen or break down on their own. That is, it is necessary to make the concentration of hydrocarbons which flow into the exhaust purification catalyst 13 vibrate by within a predetermined range of amplitude. Note that, in this case, it is necessary to hold these reducing intermediates on the basic layer 53, that is, the basic exhaust gas flow surface parts 54, until the produced reducing intermediates R—NCO and R—$NH_2$ react with the $NO_X$ in the exhaust gas or the active $NO_X^*$ or oxygen or break down themselves. For this reason, the basic exhaust gas flow surface parts 54 are provided.

On the other hand, if lengthening the feed period of the hydrocarbons, the time until the oxygen concentration becomes higher becomes longer in the period after the hydrocarbons are fed until the hydrocarbons are next fed. Therefore, the active $NO_X^*$ is absorbed in the basic layer 53 in the form of nitrates without producing reducing intermediates. To avoid this it is necessary to make the concentration of hydrocarbons which flow into the exhaust purification catalyst 13 vibrate within a predetermined range of period.

Therefore, in the embodiment according to the present invention, to react the $NO_X$ contained in the exhaust gas and the reformed hydrocarbons and produce the reducing intermediates R—NCO and R—$NH_2$ containing nitrogen and hydrocarbons, the precious metal catalysts 51 are carried on the exhaust gas flow surfaces of the exhaust purification catalyst 13. To hold the produced reducing intermediates R—NCO and R—$NH_2$ inside the exhaust purification catalyst 13, the basic exhaust gas flow surface parts 54 are formed around the precious metal catalysts 51. The reducing intermediates R—NCO and R—$NH_2$ which are held on the basic exhaust gas flow surface parts 54 are converted to $N_2$, $CO_2$, and $H_2O$. The vibration period of the hydrocarbon concentration is made the vibration period required for continuation of the production of the reducing intermediates R—NCO and R—$NH_2$. Incidentally, in the example shown in FIG. 4, the injection interval is made 3 seconds.

Figure 7A:
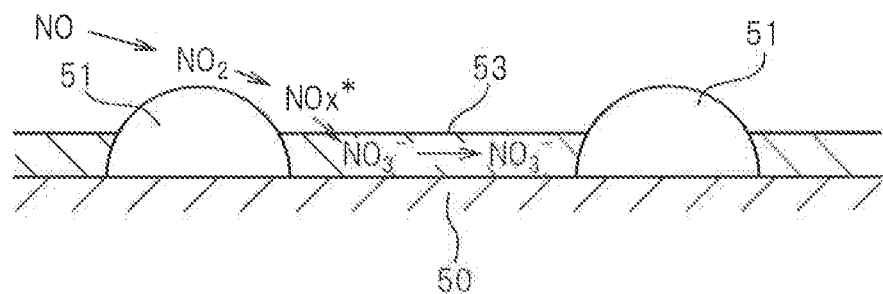
FIGS. 7A and 7B are views for explaining an oxidation reduction reaction in an exhaust purification catalyst.

If the vibration period of the hydrocarbon concentration, that is, the injection period of hydrocarbons from the hydrocarbon feed valve 15, is made longer than the above predetermined range of period, the reducing intermediates R—NCO and R—$NH_2$ disappear from the surface of the basic layer 53. At this time, the active $NO_X^*$ which is produced on the platinum Pt 53, as shown in FIG. 7A, diffuses in the basic layer 53 in the form of nitrate ions $NO_3^-$ and becomes nitrates. That is, at this time, the $NO_X$ in the exhaust gas is absorbed in the form of nitrates inside of the basic layer 53.

Figure 7B:
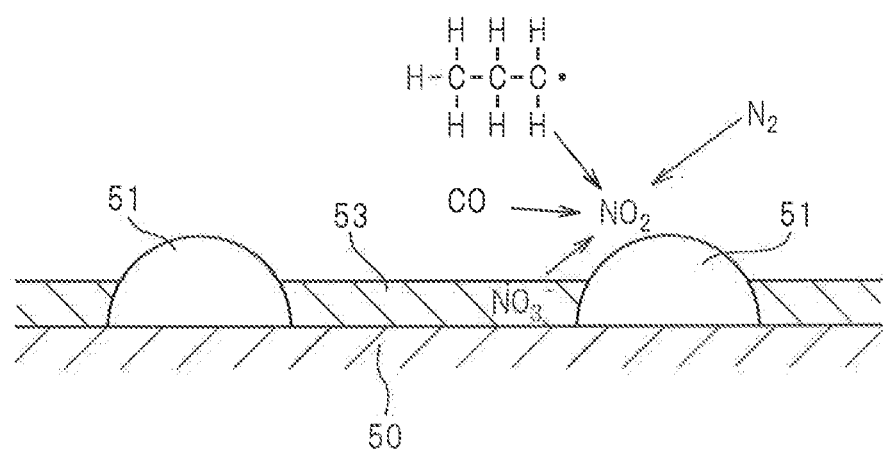

On the other hand, FIG. 7B shows the case where the air-fuel ratio of the exhaust gas which flows into the exhaust purification catalyst 13 is made the stoichiometric air-fuel ratio or rich when the $NO_X$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 successively become nitrate ions $NO_3^-$ and, as shown in FIG. 7B, are released from the basic layer 53 in the form of $NO_2$. Next, the released $NO_2$ is reduced by the hydrocarbons HC and CO contained in the exhaust gas.

Figure 8:
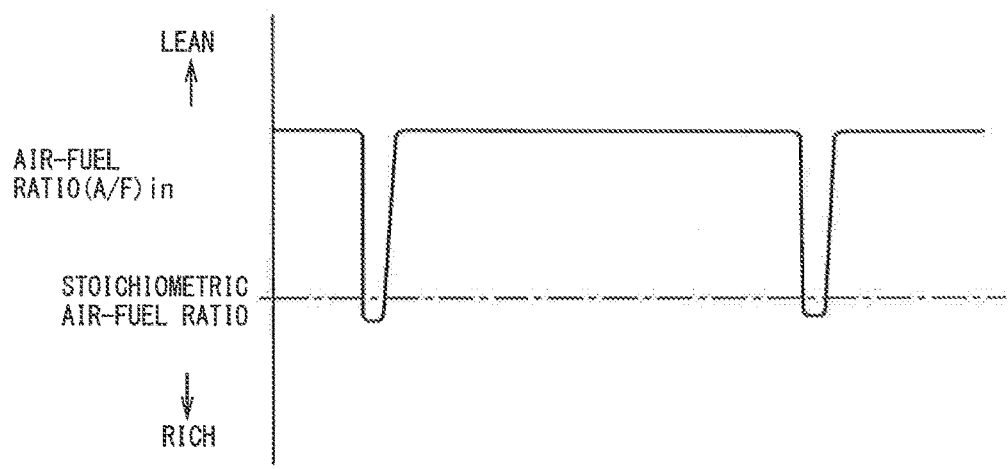
FIG. 8 is a view which shows changes in an air-fuel ratio of exhaust gas which flows into an exhaust purification catalyst.

FIG. 8 shows the case of making the air-fuel ratio (A/F) in of the exhaust gas which flows into the exhaust purification catalyst 13 temporarily rich slightly before the $NO_X$ absorption ability of the basic layer 53 becomes saturated. Note that, in the example shown in FIG. 8, the time interval of this rich control is 1 minute or more. In this case, the $NO_X$ which was absorbed in the basic layer 53 when the air-fuel ratio (A/F) in of the exhaust gas was lean is released all at once from the basic layer 53 and reduced when the air-fuel ratio (A/F) in of the exhaust gas is made temporarily rich. Therefore, in this case, the basic layer 53 plays the role of an absorbent for temporarily absorbing $NO_X$.

Note that, at this time, sometimes the basic layer 53 temporarily adsorbs the $NO_X$. Therefore, if using term of "storage" as a term including both "absorption" and "adsorption", at this time, the basic layer 53 performs the role of an $NO_X$ storage agent for temporarily storing the $NO_X$. That is, in this case, if the ratio of the air and fuel (hydrocarbons) which are supplied into the engine intake passage, combustion chambers 2, and upstream of the exhaust purification catalyst 13 in the exhaust passage is referred to as "the air-fuel ratio of the exhaust gas", the exhaust purification catalyst 13 functions as an $NO_X$ storage catalyst which stores the $NO_X$ when the air-fuel ratio of the exhaust gas is lean and releases the stored $NO_X$ when the oxygen concentration in the exhaust gas falls.

Figure 9:
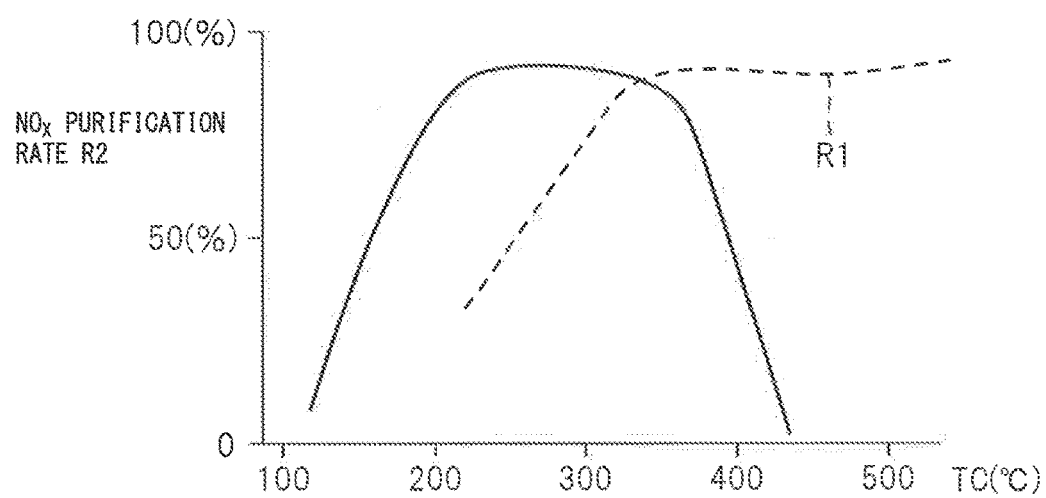
FIG. 9 is a view which shows an $NO_X$ purification rate R2.

The solid line of FIG. 9 shows the $NO_X$ purification rate R2 when making the exhaust purification catalyst 13 function as an $NO_X$ storage catalyst in this way. Note that, the abscissa of the FIG. 9 shows the catalyst temperature TC of the exhaust purification catalyst 13. When making the exhaust purification catalyst 13 function as an $NO_X$ storage catalyst, as shown in FIG. 9, when the catalyst temperature TC is 250° C. to 300° C., an extremely high $NO_X$ purification rate is obtained, but when the catalyst temperature TC becomes a 350° C. or higher high temperature, the $NO_X$ purification rate R2 falls. Note that, in FIG. 9, the $NO_X$ purification rate R1 shown in FIG. 5 is illustrated by the broken line.

In this way, when the catalyst temperature TC becomes 350° C. or more, the $NO_X$ purification rate R2 falls because if the catalyst temperature TC becomes 350° C. or more, $NO_X$ is less easily stored and the nitrates break down by heat and are released in the form of $NO_2$ from the exhaust purification catalyst 13. That is, so long as storing $NO_X$ in the form of nitrates, when the catalyst temperature TC is high, it is difficult to obtains a high $NO_X$ purification rate R2. However, in the new $NO_X$ purification method shown from FIG. 4 to FIGS. 6A and 6B, the amount of $NO_X$ stored in the form of nitrates is small, and consequently, as shown in FIG. 5, even when the catalyst temperature TC is high, a high $NO_X$ purification rate R1 is obtained.

In the embodiment according to the present invention, to be able to purify $NO_X$ by using this new $NO_X$ purification method, a hydrocarbon feed valve 15 for feeding hydrocarbons is arranged in the engine exhaust passage, an exhaust purification catalyst 13 is arranged in the engine exhaust passage downstream of the hydrocarbon feed valve 15, precious metal catalysts 51 are carried on the exhaust gas flow surfaces of the exhaust purification catalyst 13, the basic exhaust gas flow surface parts 54 are formed around the precious metal catalysts 51, the exhaust purification catalyst 13 has the property of reducing the $NO_X$ contained in exhaust gas if making a concentration of hydrocarbons flowing into the exhaust purification catalyst 13 vibrate within a predetermined range of amplitude and within a predetermined range of period and has the property of being increased in storage amount of $NO_X$ contained in exhaust gas if making the vibration period of the concentration of hydrocarbons longer than this predetermined range, and, at the time of engine operation, the hydrocarbons are injected from the hydrocarbon feed valve 15 within the predetermined range of period to thereby reduce the $NO_X$ which is contained in the exhaust gas in the exhaust purification catalyst 13.

That is the $NO_X$ purification method which is shown from FIG. 4 to FIGS. 6A and 6B can be said to be a new $NO_X$ purification method designed to remove $NO_X$ without forming so much nitrates in the case of using an exhaust purification catalyst which carries precious metal catalysts and forms a basic layer which can absorb $NO_X$. In actuality, when using this new $NO_X$ purification method, the nitrates which are detected from the basic layer 53 are smaller in amount compared with the case where making the exhaust purification catalyst 13 function as an $NO_X$ storage catalyst. Note that, this new $NO_X$ purification method will be referred to below as the "first $NO_X$ removal method".

Figure 10:
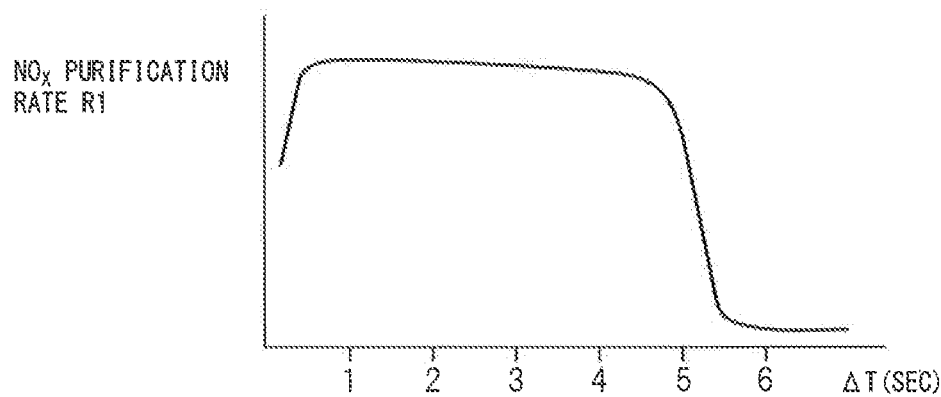
FIG. 10 is a view which shows a relationship between a vibration period $\Delta T$ of hydrocarbon concentration and an $NO_X$ purification rate R1.

Now, as mentioned, before, if the injection period $\Delta T$ of the hydrocarbons from the hydrocarbon feed valve 15 becomes longer, the time period in which the oxygen concentration around the active $NO_X^*$ becomes higher becomes longer in the time period after the hydrocarbons are injected to when the hydrocarbons are next injected. In this case, in the embodiment shown in FIG. 1, if the injection period $\Delta T$ of the hydrocarbons becomes longer than about 5 seconds, the active $NO_X^*$ starts to be absorbed in the form of nitrates inside the basic layer 53. Therefore, as shown in FIG. 10, if the vibration period $\Delta T$ of the hydrocarbon concentration becomes longer than about 5 seconds, the $NO_X$ purification rate R1 falls. Therefore, the injection period $\Delta T$ of the hydrocarbons has to be made 5 seconds or less.

On the other hand, in the embodiment of the present invention, if the injection period $\Delta T$ of the hydrocarbons becomes about 0.3 second or less, the injected hydrocarbons start to build, up on the exhaust gas flow surfaces of the exhaust purification catalyst 13, therefore, as shown in FIG. 10, if the injection period $\Delta T$ of the hydrocarbons becomes about 0.3 second or less, the $NO_X$ purification rate R1 falls. Therefore, in the embodiment according to the present invention, the injection period of the hydrocarbons is made from 0.3 second to 5 seconds.

Figure 11A:
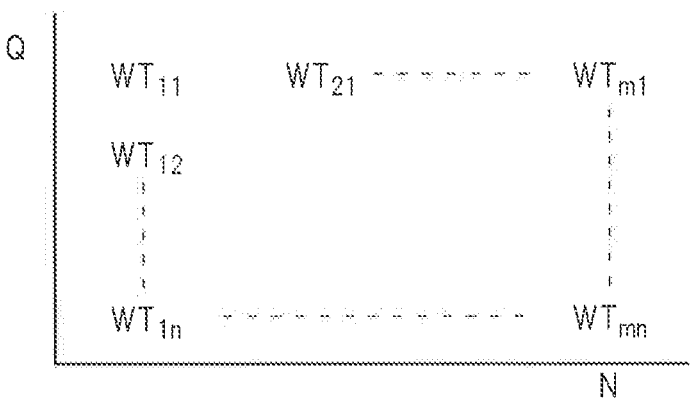
FIGS. 11A and 11B are views which show maps of the injection amount of hydrocarbons etc.
Figure 11B:
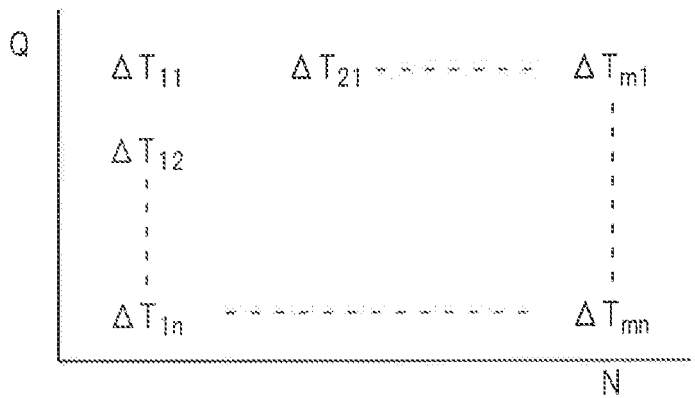

Now that, in the embodiment according to the present invention, when the $NO_X$ purification action by the first $NO_X$ purification method is performed, by controlling the injection amount and injection timing of hydrocarbons from the hydrocarbon feed valve 15, the air-fuel ratio (A/F) in of the exhaust gas flowing into the exhaust purification catalyst 13 and the injection period $\Delta T$ of the hydrocarbons are controlled so as to become the optimal values for the engine operating state. In this case, in the embodiment according to the present invention, the optimum hydrocarbon injection amount WT when the $NO_X$ purification action by the first $NO_X$ purification method is performed is stored as a function of the injection amount Q from fuel injectors 3 and the engine speed N in the form of a map such as shown in FIG. 11A in advance in the ROM 32. Further, the optimum injection period $\Delta T$ of the hydrocarbons at this time is also stored as a function of the injection amount Q from the fuel injectors 3 and the engine speed N in the form of a map such as shown in FIG. 11B in advance in the ROM 32.

Next, referring to FIG. 12 and FIG. 13, an $NO_X$ purification method when making the exhaust purification catalyst 13 function as an $NO_X$ storage catalyst will be explained specifically. The $NO_X$ purification method in the case of making the exhaust purification catalyst 13 function as an $NO_X$ storage catalyst in this way will be referred to below as the "second $NO_X$ removal method".

In this second $NO_X$ removal method, as shown in FIG. 12, when the stored $NO_X$ amount $\Sigma NO_X$ of $NO_X$ which is stored in the basic layer 53 exceeds a predetermined allowable amount MAX, the air-fuel ratio (A/F) in of the exhaust gas flowing into the exhaust purification catalyst 13 is temporarily made rich. If the air-fuel ratio (A/F) in of the exhaust gas is made rich, the $NO_X$ which was stored in the basic layer 53 when the air-fuel ratio (A/F) in of the exhaust gas was lean is released from the basic layer 53 all at one and reduced. Due to this, the $NO_X$ is removed. Note that if the operating state of the engine is determined, the amount of $NO_X$ which is exhausted from the engine is accordingly determined. In the example shown in FIG. 12, the stored $NO_X$ amount $\Sigma NO_X$ is calculated from the amount of $NO_X$ exhausted in accordance with the operating state of the engine.

In this second $NO_X$ removal method, as shown in FIG. 13, by injecting an additional fuel WR into each combustion chamber 2 from the fuel injector 3 in addition to the combustion-use fuel Q, the air-fuel ratio (A/F) in of the exhaust gas which flows into the exhaust purification catalyst 13 is made rich. Note that, in FIG. 13, the abscissa indicates the crank angle. This additional fuel WR is injected at a timing at which it will burn, but will not appear as engine output, that is, slightly before ATDC90° after compression top dead center. This fuel amount WR is stored as a function of the injection amount Q and engine speed N in the form of a map in advance in the ROM 32. Note that, in the embodiment according to the present invention, roughly speaking, the second $NO_X$ removal method is used when the catalyst temperature TC is low while the first $NO_X$ removal method is used when the catalyst temperature TC is high.

Figure 14A:
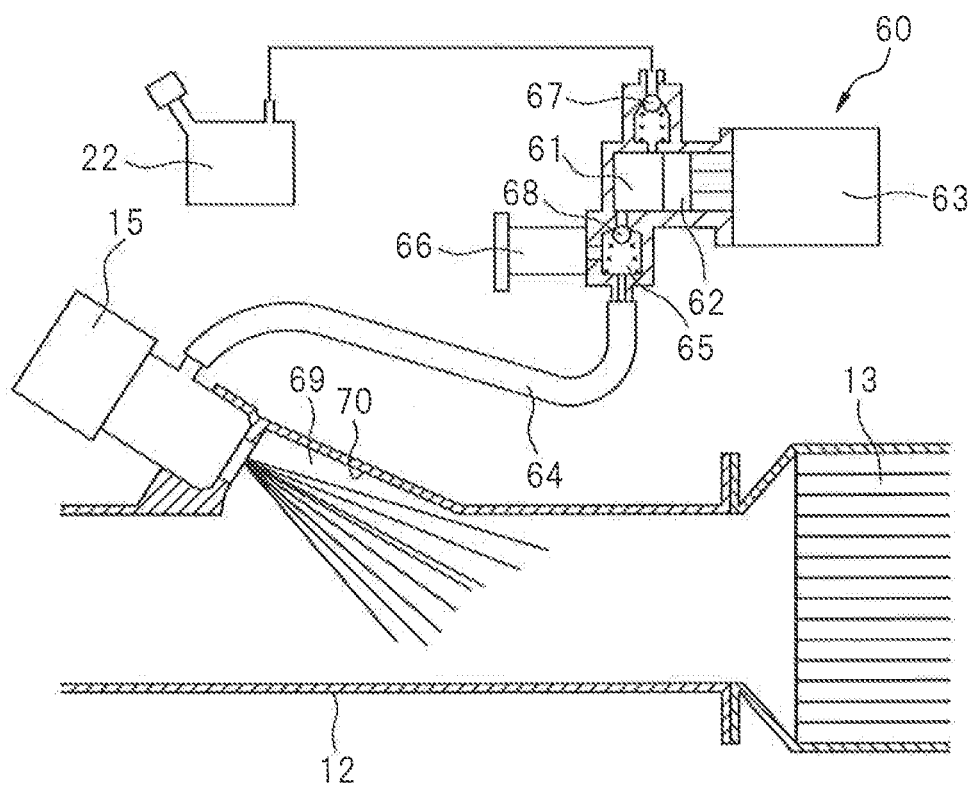
FIGS. 14A and 14B are views for explaining a fuel feed device etc.
Figure 14B:
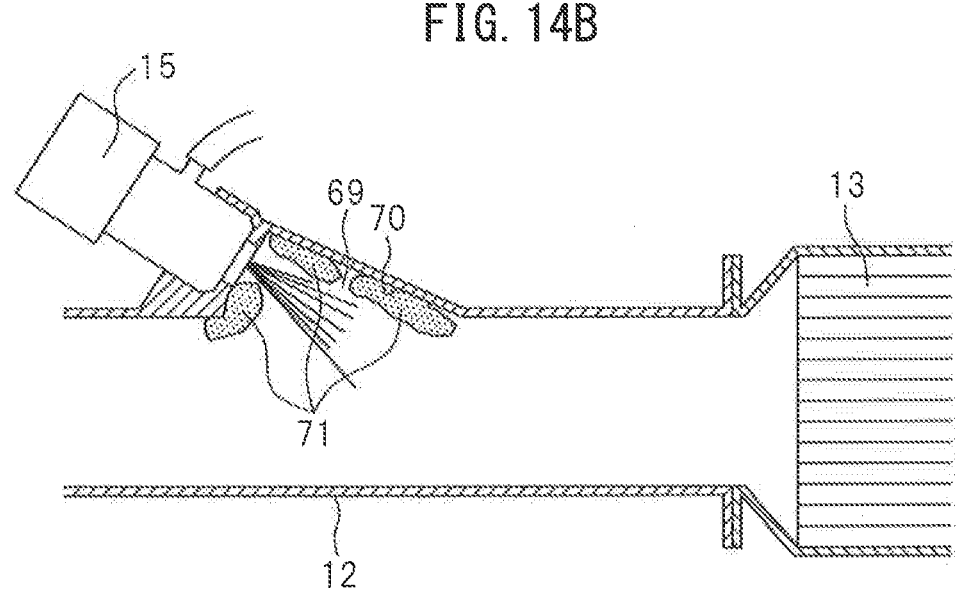

FIGS. 14A and 14B show enlarged views of the surrounding of the hydrocarbon feed valve 15 shown in FIG. 1. Note that, FIG. 14A shows a fuel feed device 60 for feeding hydrocarbons, that is, fuel to the hydrocarbon feed valve 15. As shown in FIG. 14A, the fuel feed device 60 is comprised of a pump chamber 61 which is filled with pressurized fuel, a pressurizing piston 62 for pressurizing the fuel in the pump chamber 61, an actuator 63 for driving the pressurizing piston 62, a pressurized fuel outflow chamber 65 which is connected through the fuel feed pipe 64 to the hydrocarbon feed valve 15, and a pressure sensor 66 for detecting the fuel pressure in the pressurized fuel outflow chamber 65. The pump chamber 61 is on the one hand connected to the fuel tank 22 through a check valve 67 which enables flow only from the fuel tank 22 toward the pump chamber 61 and on the other hand connected to the pressurized fuel outflow chamber 65 through a check valve 68 which enables flow only from the pump chamber 61 toward the pressurized fuel outflow chamber 65.

If the actuator 63 causes the pressurizing piston 62 to move to the right in FIG. 14A, the fuel in the fuel tank 22 is sent through the check valve 67 to the inside of the pump chamber 61, while if the actuator 63 causes the pressurizing piston 62 to move to the left in FIG. 14A, the fuel in the pump chamber 61 is pressurized and sent through the check valve 63 to the inside of the pressurized fuel outflow chamber 65. Next, this fuel is fed to the hydrocarbon feed valve 15. The fuel which is fed to the hydrocarbon feed valve 15, that is, the hydrocarbons, is injected from the nozzle port of the hydrocarbon feed valve 15 along the injection path 69 to the inside of the exhaust gas. In the example which is shown in FIG. 14A, the nozzle port of this hydrocarbon feed valve 15 is arranged in a recessed part 70 which is formed at the inside wall surface of the exhaust pipe 12. At the inside of this recessed part 70, the injection path 69 is formed.

Figure 15:
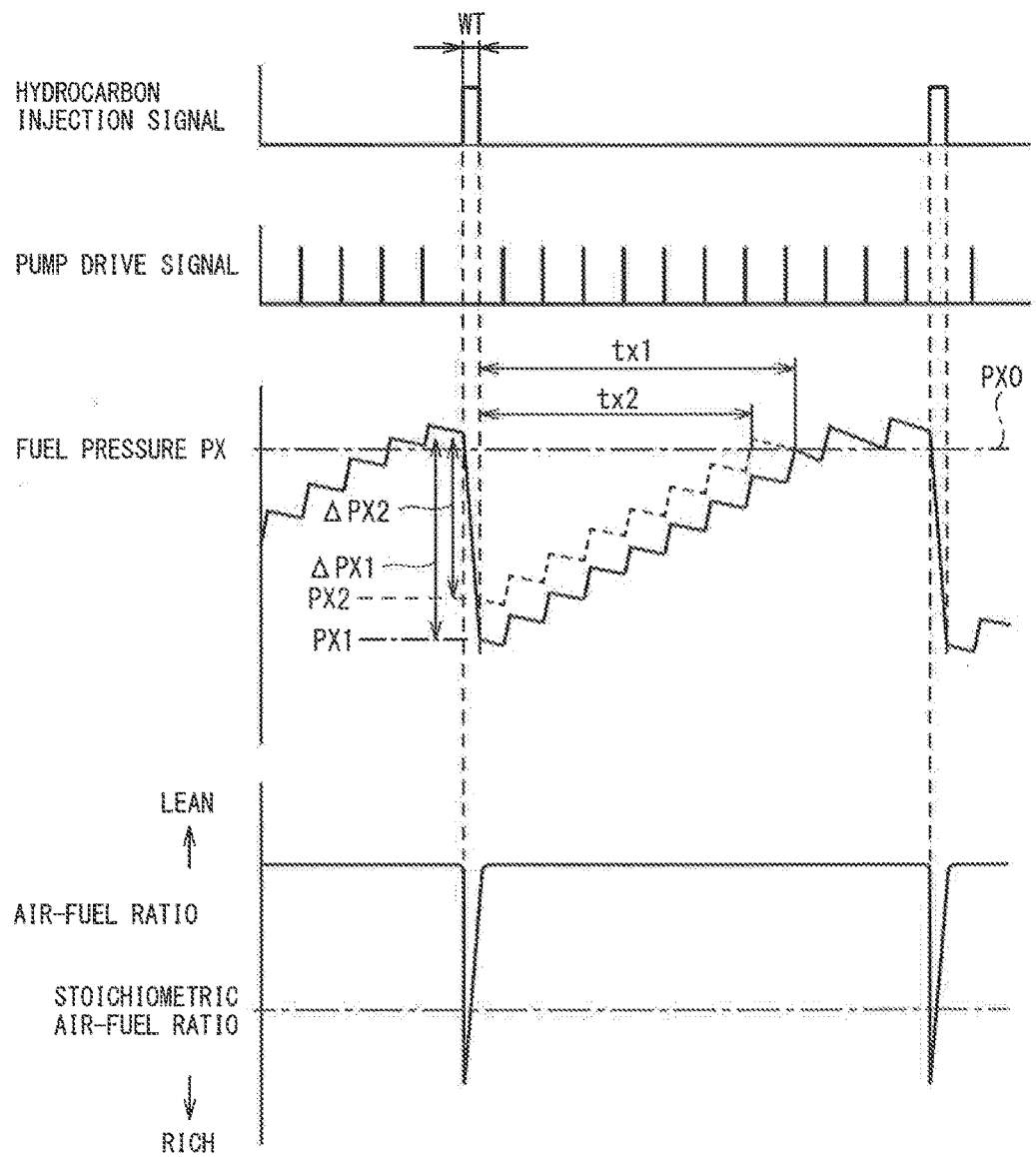
FIG. 15 is a time chart which shows a change in the fuel pressure PX fed into the hydrocarbon feed valve.

FIG. 15 shows an injection signal of hydrocarbons from the hydrocarbon feed valve 15, a pump drive signal for driving the pressurizing piston 62 by the actuator 63, a change of fuel pressure PX of fuel which is fed to the hydrocarbon feed valve 15, and a change of air-fuel ratio of exhaust gas which flows into the exhaust purification catalyst 13 when an $NO_X$ removal action is performed by the first $NO_X$ removal method. Note that, the fuel pressure PX of fuel which is fed to the hydrocarbon feed valve 15 shows the fuel pressure inside the hydrocarbon feed valve 15, that is, the fuel pressure inside the fuel feed pipe 64. If the pump drive signal is generated, the actuator 63 is driven and the fuel in the pump chamber 61 is pressurized by the pressurizing piston 62. Due to this, as shown in FIG. 15 by the solid line, the fuel pressure PX of the fuel which is fed to the hydrocarbon feed valve 15 is made to rapidly rise just a bit. Next, the fuel pressure PX falls just slightly due to the leakage of fuel to the pump chamber 61 etc. This fuel pressure PX, as shown in FIG. 15 by the solid line, is made to increase a little at a time until the target fuel pressure PXO each time the pump drive signal is generated. If the fuel pressure PX reaches the target fuel pressure PXO, after that, the pressurizing piston 62 is made to operate when the fuel pressure PX falls lower than the target fuel pressure PXO and the action of increasing the fuel pressure PX is performed.

On the other hand, if the hydrocarbon injection signal is issued, the hydrocarbon feed valve 15 is made to open. Due to this, the fuel, that is, hydrocarbons, is injected from the hydrocarbon feed valve 15. Note that at this time the opening time of the hydrocarbon feed valve 15 is made the injection time WT which is calculated from the map shown in FIG. 11A. If hydrocarbons are injected from the hydrocarbon feed valve 15, as shown in FIG. 15 by the solid line, the fuel pressure PX of the fuel which is fed to the hydrocarbon feed valve 15 rapidly falls. If the fuel pressure PX falls, the pressurizing piston 62 is made to operate each time the pump drive signal is generated and the fuel pressure PX is made to increase a little at a time until the target fuel pressure PXO.

In this regard, if the hydrocarbon feed valve 15 is clogged, the amount of hydrocarbons which are injected from the hydrocarbon feed valve 15 per unit time decreases. As a result, as shown an FIG. 15 by the broken line, the drop ΔPX2 of the fuel pressure PX of the fuel which is fed to the hydrocarbon feed valve 15 when the hydrocarbon feed valve 15 is made to open becomes smaller. Not that, in FIG. 15, ΔPX1 shows the drop of fuel pressure PX when the hydrocarbon feed valve 15 is not clogged. If the hydrocarbon feed valve 15 is clogged in this way, compared with when the hydrocarbon feed valve 15 is not clogged, the drop ΔPX of the fuel pressure PX becomes smaller. Therefore, when the drop ΔPX of the fuel pressure PX becomes smaller, it can be judged that the hydrocarbon feed valve 15 is clogged.

Now, in FIG. 1, for example, when the fuel injector 3 is clogged, the drop in the fuel pressure inside the common rail 20 when fuel is injected from the fuel injector 3 decreases. However, in this case, since the volume of the common rail 20 is large, at this time, the drop in fuel pressure inside the common rail 20 is extremely small. Therefore, at this time, it is difficult to detect clogging of the fuel injector 3 from the change in the drop of fuel pressure in the common rail 20. However, in the fuel feed device 60 which is used in the present invention, the sum of the volumes of the parts which store the fuel which is fed to the hydrocarbon feed valve 15, that is the sum of the volumes of the inside of the fuel feed pipe 64, the inside of the hydrocarbon feed valve 15, and the inside of pressurized fuel outflow chamber 65, is small. Therefore, when the hydrocarbon feed valve 15 is clogged, the drop ΔPX of the fuel pressure TX of the fuel which is fed to the hydrocarbon feed valve 15 greatly appears. Therefore, in the present invention, it becomes possible to accurately detect from the drop ΔPX of the fuel pressure PX whether the hydrocarbon feed valve 15 is clogged.

Note that, as will be understood from FIG. 15, when the drop ΔPX of the fuel pressure PX falls from ΔPX1 to ΔPX2, the fuel pressure PX when it falls the most increases from PX1 to PX2, the time tX after the fuel pressure PX falls, then rises to the target pressure PXO is shortened from tX1 to tX2, and the number of times the pump is driven when the fuel pressure PX falls, then rises to the target pressure PXO decreases. In the present invention, at expressed in a representative manner to cover all of these phenomena, a drop ΔPX of the fuel pressure PX is used. Therefore, in the present invention, a small drop ΔPX of the fuel pressure PX includes an increase of the fuel pressure PX when fallen the most, a shorter time tX from when the fuel pressure PX falls, then rises to the target pressure PXO, and a decreased number of times the pump is driven when the fuel pressure PX falls, then rises to the target pressure PXO.

Now, if hydrocarbons are injected from the hydrocarbon feed valve 15, the hydrocarbons are partially oxidized or oxidized on the exhaust purification catalyst 13. The heat of oxidation reaction which occurs at this time is used to make the exhaust purification catalyst 13 rise in temperature. Regarding the cases where the hydrocarbons which are injected from the hydrocarbon feed valve 15 are used to make the exhaust purification catalyst 13 rise in temperature, these include the case of warming up the exhaust purification catalyst 13, the case of releasing the $SO_X$ from the exhaust purification catalyst 13, and other cases, but below, the case of regenerating the particulate filter 14 by using the hydrocarbons which are injected from the hydrocarbon feed valve 15 to make the exhaust purification catalyst 13 rise in temperature will be used as an example to perform control to raise the temperature of the exhaust purification catalyst 13. To regenerate the particulate filter 14, it is necessary to make the temperature of the particulate filter 14 rise until the 600° C. or so regeneration temperature. In order to make the temperature of the particulate filter 14 rise until the regeneration temperature, the temperature of the exhaust purification catalyst 13 has to be raised to the target temperature at which the particulate filter 14 can start the regeneration action. Next, the temperature raising control of the exhaust purification catalyst 13 will be explained with reference to FIG. 16.

Figure 16:
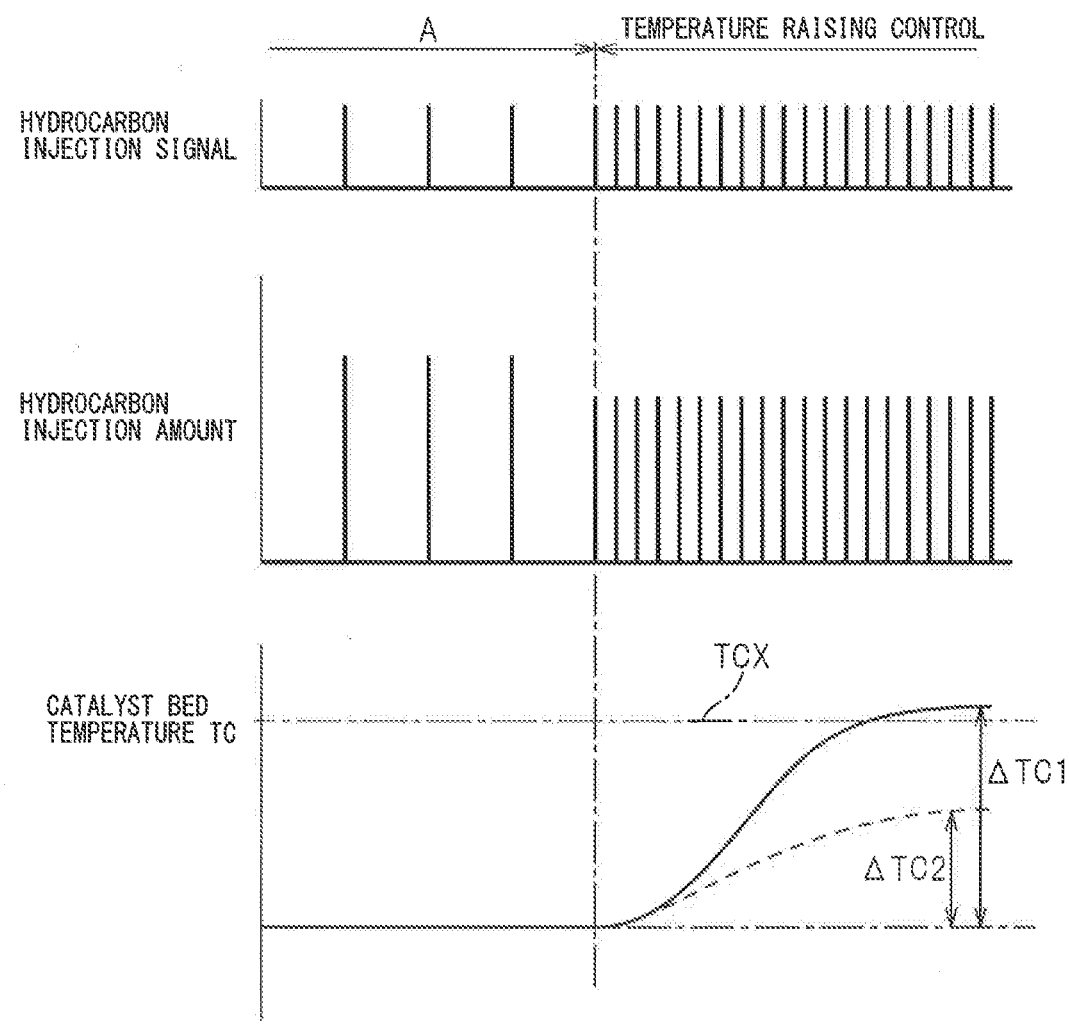
FIG. 16 is a time chart which shows a change in the temperature TC of the exhaust purification catalyst bed etc.

FIG. 16 shows the the injection signal of hydrocarbons from the hydrocarbon feed valve 15, the injection amount of hydrocarbons from the hydrocarbon feed valve 15, and the change of the catalyst bed temperature TC of the exhaust purification catalyst 13 when performing regeneration control of the particulate filter 14 while performing the $NO_X$ removal action by the first $NO_X$ removal method. Note that, in FIG. 16, TCX shows the target temperature at which the particulate filter 14 starts the regeneration action. In the region in FIG. 16 which is shown by A, the temperature raising action of the exhaust purification catalyst 13 is not performed. At this time, the $NO_X$ removal action by the first $NO_X$ removal method is performed. At this time, the catalyst bed temperature TC of the exhaust purification catalyst 13 is maintained at a relatively low temperature.

Figure 17A:
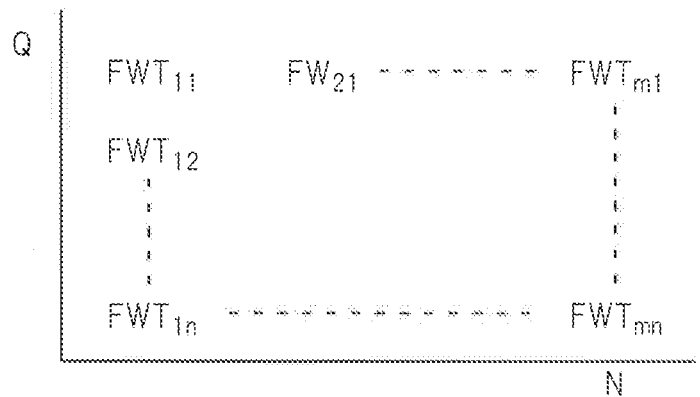
FIGS. 17A and 17B are views which show an injection amount of hydrocarbons etc.
Figure 17B:
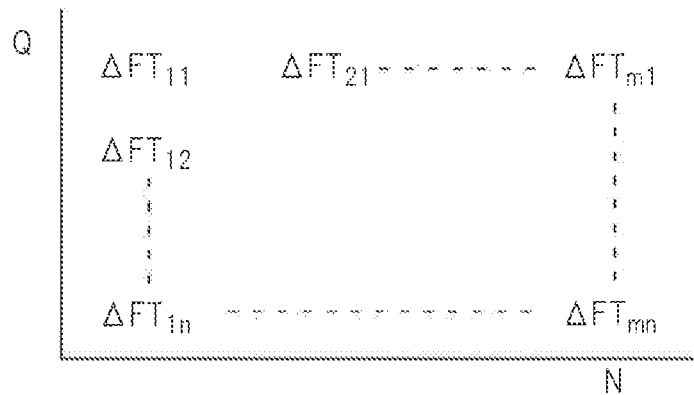

Next, the temperature raising control of the exhaust purification catalyst 13 is performed while performing the $NO_X$ removal action by the first $NO_X$ removal method. At this time, the injection period of hydrocarbons from the hydrocarbon feed valve 15 is made shorter, and the amount of injection of hydrocarbons from the hydrocarbon feed valve 15 per unit time is increased. In the embodiment according to the present invention, the optimal hydrocarbon injection amount FWT when performing temperature raising control of the exhaust purification catalyst 13 while performing the $NO_X$ removal action by the first $NO_X$ removal method is stored as a function of the injection amount Q from the fuel injector 3 and the engine speed N in the form of a map such as shown in FIG. 17A in advance in the ROM 32. Further, the optimal injection period ΔFT of hydrocarbons at this time is also stored as a function of the injection amount Q from the fuel injector 3 and the engine speed N in the form of a map such as shown in FIG. 17B in advance in the ROM 32.

If temperature raising control of the exhaust purification catalyst 13 is performed, usually as shown in FIG. 16 by the solid line, the catalyst bed temperature TC of the exhaust purification catalyst 13 is raised by exactly ΔTC1 and reaches the target temperature TCX whereby the action of regeneration of the particulate filter 14 is performed. That is, the amount of injection of hydrocarbons per unit time, corresponding to the operating state of the engine, required for raising the catalyst bed temperature TC of the exhaust purification catalyst 13 by exactly ΔTC1 is found in advance. Hydrocarbons are injected from the hydrocarbon feed valve 15 by this amount of injection of hydrocarbons per unit time found in advance required for raising the catalyst bed temperature TC of the exhaust purification catalyst 13 by exactly ΔTC1. At this time the catalyst bed temperature TC of the exhaust purification catalyst 13 is raised by exactly ΔTC1 and reaches the target temperature TCX whereby the action of regeneration of the particulate filter 14 is performed.

In this regard, in this case, if for example the hydrocarbon feed valve 15 clogs, even if an instruction is issued for injecting the hydrocarbons from the hydrocarbon feed valve 15 by the amount of injection of hydrocarbons found in advance required for raising the catalyst bed temperature TC of the exhaust purification catalyst 13 by exactly ΔTC1, the amount of injection of hydrocarbons from the hydrocarbon feed valve 15 is decreased. As a result, for example, as shown in FIG. 16 by the broken line, the catalyst bed temperature TC of the exhaust purification catalyst 13 only rises by ΔTC2. Therefore, in this case, it is necessary to correct the hydrocarbon injection amount per unit time to increase so that the catalyst bed temperature TC of the exhaust purification catalyst 13 reaches the target temperature TCX. However, when in this way using the catalyst bed temperature TC of the exhaust purification catalyst 13 as the basis to correct the injection amount of hydrocarbons, it is necessary to accurately estimate the catalyst bed temperature TC of the exhaust purification catalyst 13.

In this regard, if a large amount of hydrocarbons per injection is injected from the hydrocarbon feed valve 15 such as when the $NO_X$ removal action by the first $NO_X$ removal method is performed, the precision of estimation of the catalyst bed temperature TC of the exhaust purification catalyst 13 ends up falling. That is, even in the past, at the time of regeneration of the particulate filter, sometimes additional fuel is fed into the combustion chamber or exhaust passage, but when, as in the present invention, the regeneration control of the particulate filter 14 is performed while performing the $NO_X$ removal action by the first $NO_X$ removal method, the amount of hydrocarbons per injection from the hydrocarbon feed valve 15 becomes considerably greater compared with the past. If the amount of hydrocarbons per injection becomes greater, the hydrocarbons cannot completely react at just the front end of the exhaust purification catalyst 13 and react at the downstream side to generate the heat of reaction. As a result, the temperature gradient in the exhaust purification catalyst 13 becomes uneven. The catalyst bed temperature TC of the exhaust purification catalyst 13 is obtained by estimation or detection of one part somewhere in the exhaust purification catalyst 13. Therefore, if the temperature gradient in the exhaust purification catalyst 13 becomes uneven, the estimated or detected temperature no longer represents the be temperature TC of the catalyst as a whole. As a result, the precision of estimation of the catalyst bed temperature TC falls.

In this way, when the $NO_X$ removal action by the first $NO_X$ removal method is being performed, the precision of estimation of the catalyst bed temperature it falls. Therefore, for example, regardless of the fact that the hydrocarbon feed valve 15 is not clogged, there is the danger of the hydrocarbon feed valve 15 being mistakenly judged as clogged. To prevent such mistaken judgment, it is necessary to make up for the drop in the precision of estimation of the catalyst bed temperature TC. Therefore, in the present invention, the judgment of the results of detection of the fuel pressure PX of the fuel which is fed to the hydrocarbon feed valve 15 is jointly used. Due to this, it is possible to judge clogging of the hydrocarbon feed valve 15 with a higher precision compared with judgment from a change of the catalyst bed temperature TC.

In this regard, the temperature of the catalyst bed temperature TC of the exhaust purification catalyst 13 was found to be greatly affected not only by clogging of the hydrocarbon feed valve 15, but also other phenomena. Next, this will be explained with reference to FIG. 14B. That is, if hydrocarbons are injected from the hydrocarbon feed valve 15 along the injection path 69, the injected fuel deposits on the inside wall surfaces of the exhaust pipe 12 around the injection path 69, mainly the inside, wall surfaces of the recessed part 70, and sometimes the particulates contained in the exhaust gas gradually build up on the deposited injected fuel. In this case, deposits 71 form on the inside wall surfaces of the exhaust pipe 12. Due to the deposits 71, the injection path 69 is clogged.

If the deposits 71 form on the inside wall surfaces of the exhaust pipe 12 in this way, for example, even if hydrocarbons are injected from the hydrocarbon feed valve 15 to regenerate the particulate filter 14, the hydrocarbons deposit on the deposits 71 and, as a result, the exhaust purification catalyst 13 is no longer sufficiently fed with hydrocarbons. Therefore, in this case, even if the hydrocarbon feed valve 15 is not clogged, the catalyst bed temperature TC of the exhaust purification catalyst 13 no longer reaches the target temperature TCX. That is, even if the hydrocarbon feed valve 15 is clogged or even if the injection path 69 is clogged by the deposits 71, the temperature rise of the exhaust purification catalyst 13 due to the hydrocarbons which are fed from the hydrocarbon feed valve 15 becomes smaller than a predetermined rise. In other words, when the temperature rise of the exhaust purification catalyst 13 due to the hydrocarbons which are fed from the hydrocarbon feed valve 15 becomes smaller than the predetermined rise, it can be judged that the hydrocarbon feed valve 15 is clogged or the injection path 69 is clogged by the deposits 71.

In this case, when hydrocarbons are injected from the hydrocarbon feed valve 15, if the drop $\Delta PX$ of the fuel pressure PX of the fuel which is fed to the hydrocarbon feed valve 15 becomes smaller, it is judged that the hydrocarbon feed valve 15 is clogged. Therefore, when the temperature rise of the exhaust purification catalyst 13 due to the hydrocarbons which are fed from the hydrocarbon feed valve 15 becomes smaller than a predetermined rise, if the drop $\Delta PX$ of the fuel pressure PX of the fuel which is fed to the hydrocarbon feed valve 15 becomes larger, it can be judged that the injection path 69 is clogged by the deposits 71.

Therefore, in the present invention, in a control system of an internal combustion engine which comprises an exhaust purification catalyst 13 arranged in an engine exhaust passage, a hydrocarbon feed valve 15 arranged in the engine exhaust passage upstream of the exhaust purification catalyst 13, and a fuel feed device 60 for feeding fuel to the hydrocarbon feed valve 15, and in which hydrocarbons is injected from the hydrocarbon feed valve 15 into an exhaust gas along a predetermined injection path, and fuel pressure of fuel which is fed to the hydrocarbon feed valve 15 falls when hydrocarbons are injected from the hydrocarbon feed valve 15, when a temperature rise of the exhaust purification catalyst 13 due to the hydrocarbon fed from the hydrocarbon feed valve 15 as smaller than a predetermined rise and a drop of the fuel pressure of fuel fed to the hydrocarbon feed valve 15 is larger than a predetermined drop, it is judged that the injection path 69 is clogged.

FIG. 18 shows the injection control routine for working this invention. This routine is executed by interruption every fixed time period.

Referring to FIG. 18, first, at step 80, hydrocarbons are injected from the hydrocarbon feed valve 15 and the $NO_X$ removal action by the first $NO_X$ removal method is performed. Next, at step 81, the change of the catalyst bed temperature TC of the exhaust purification catalyst 13 is estimated. This catalyst bed temperature TC can be estimated using a model and can be estimated from the output value of the temperature sensor 23. Next, at step 82, the change of the fuel pressure PX of the fuel which is fed to the hydrocarbon feed valve 15 is detected by the fuel pressure sensor 66.

Next, at step 83, it is judged if the temperature rise $\Delta TC$ of the exhaust purification catalyst 13 due to the hydrocarbons fed from the hydrocarbon feed valve 15 is smaller than a predetermined set amount and the drop $\Delta PX$ of the fuel pressure of fuel fed to the hydrocarbon feed valve 15 is larger than a predetermined set amount. In this case, the predetermined set amount for the temperature rise $\Delta TC$ is, for example, made a temperature rise corresponding to 80 percent of the predetermined temperature rise $\Delta TC1$, while the predetermined set amount for the drop $\Delta PX$ of the feed fuel pressure PX is, for example, made a fuel, pressure drop corresponding to 80 percent of the drop $\Delta PX1$ of the feed fuel pressure PX when the hydrocarbon feed valve 15 is not clogged.

When, at step 83, it is judged that the temperature rise $\Delta TC$ of the exhaust purification catalyst 13 due to the hydrocarbons fed from the hydrocarbon feed valve 15 is smaller than the predetermined set amount and the drop $\Delta PX$ of the fuel pressure of fuel fed to the hydrocarbon feed valve 15 is larger than the predetermined set amount, the routine proceeds to step 84 where it is judged that the injection path 69 is clogged.

On the other hand, when it is judged from the drop $\Delta PX$ of the fuel pressure PX of the fuel which is fed to the hydrocarbon feed valve 15 that the hydrocarbon feed valve 15 is clogged, if the catalyst bed temperature TC of the exhaust purification catalyst 13 reaches the target temperature TCX, it becomes questionable if the hydrocarbon feed valve 15 is actually clogged. As opposed to this, when it is judged from the drop $\Delta PX$ of the fuel pressure PX of the fuel which is fed to the hydrocarbon feed valve 15 that the hydrocarbon feed valve 15 is clogged, if the catalyst bed temperature TC of the exhaust purification catalyst 13 does not reach the target temperature TCX, the possibility of the hydrocarbon feed valve 15 being clogged becomes extremely high.

That is, when the drop $\Delta PX$ of the fuel pressure PX of the fuel which is fed to the hydrocarbon feed valve 15 becomes small when hydrocarbons are injected from the hydrocarbon feed valve 15, if the temperature rise of the exhaust purification catalyst 13 due to the hydrocarbons which are fed from the hydrocarbon feed valve 15 becomes smaller than a predetermined rise, it can be judged that the hydrocarbon feed valve 15 is clogged.

Therefore, in the present invention, in a control system of internal combustion engine which comprises an exhaust purification catalyst 13 arranged in an engine exhaust passage, a hydrocarbon feed valve 15 arranged in the engine exhaust passage upstream of the exhaust purification catalyst 13, and a fuel feed device 60 for feeding fuel to the hydrocarbon feed valve 15, and in which hydrocarbons is injected from the hydrocarbon feed valve 15 into an exhaust gas along a predetermined injection path, and fuel pressure of fuel which is fed to the hydrocarbon feed valve 15 fails when hydrocarbons are injected from the hydrocarbon feed valve 15, when a temperature rise of the exhaust purification catalyst 13 due to the hydrocarbons fed from the hydrocarbon feed valve 15 is smaller than a predetermined rise and a drop of the fuel pressure of fuel fed to the hydrocarbon feed valve 15 is smaller than a predetermined drop, it is judged that the hydrocarbon feed valve 15 is clogged.

Figure 19:
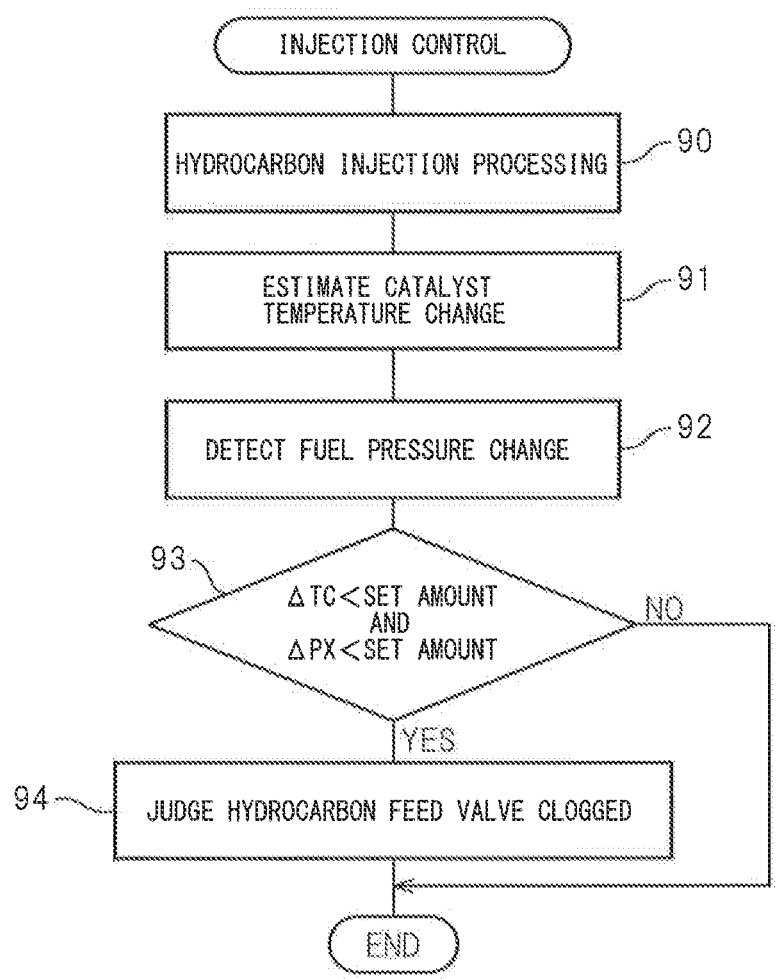
FIG. 19 is a flow chart for performing an injection control.

FIG. 19 shows the injection control routine for working this invention. This routine is executed by interruption every fixed time period.

Referring to 19, first, at step 90, hydrocarbons are injected from the hydrocarbon feed valve 15 and the $NO_X$ removal action by the first $NO_X$ removal method is performed. Next, at step 91, the change of the catalyst bed temperature TC of the exhaust purification catalyst 13 is estimated. This catalyst bed temperature TC can be estimated using a model and can be estimated from the output value of the temperature sensor 23. Next, at step 92, the change of the fuel pressure PX of the fuel which is fed to the hydrocarbon feed valve 15 is detected by the fuel pressure sensor 66.

Next, at step 93, it is judged if the temperature rise $\Delta TC$ of the exhaust purification catalyst 13 due to the hydrocarbons fed from the hydrocarbon feed valve 15 is smaller than a predetermined set amount and the drop $\Delta PX$ of the fuel pressure of fuel fed to the hydrocarbon feed valve 15 is smaller than a predetermined set amount. In this case as well, in the same way as the injection control routine which is shown in FIG. 18, the predetermined set amount for the temperature rise $\Delta TC$ is, for example, made a temperature rise corresponding to 80 percent of the predetermined temperature rise $\Delta TC1$, while the predetermined set amount for the drop $\Delta PX$ of the feed fuel pressure PX is, for example, made a fuel pressure drop corresponding to 80 percent of the drop $\Delta PX1$ of the feed fuel pressure PX when the hydrocarbon feed valve 15 is not clogged.

When, at step 93, it is judged that the temperature rise $\Delta TC$ of the exhaust purification catalyst 13 due to the hydrocarbons fed from the hydrocarbon feed valve 15 is smaller than the predetermined set amount and the drop ΔPX of the fuel pressure of fuel fed to the hydrocarbon feed valve 15 is smaller than the predetermined set amount, the routine proceeds to step 94 where it is judged that the hydrocarbon feed valve 15 is clogged.

Figure 20:
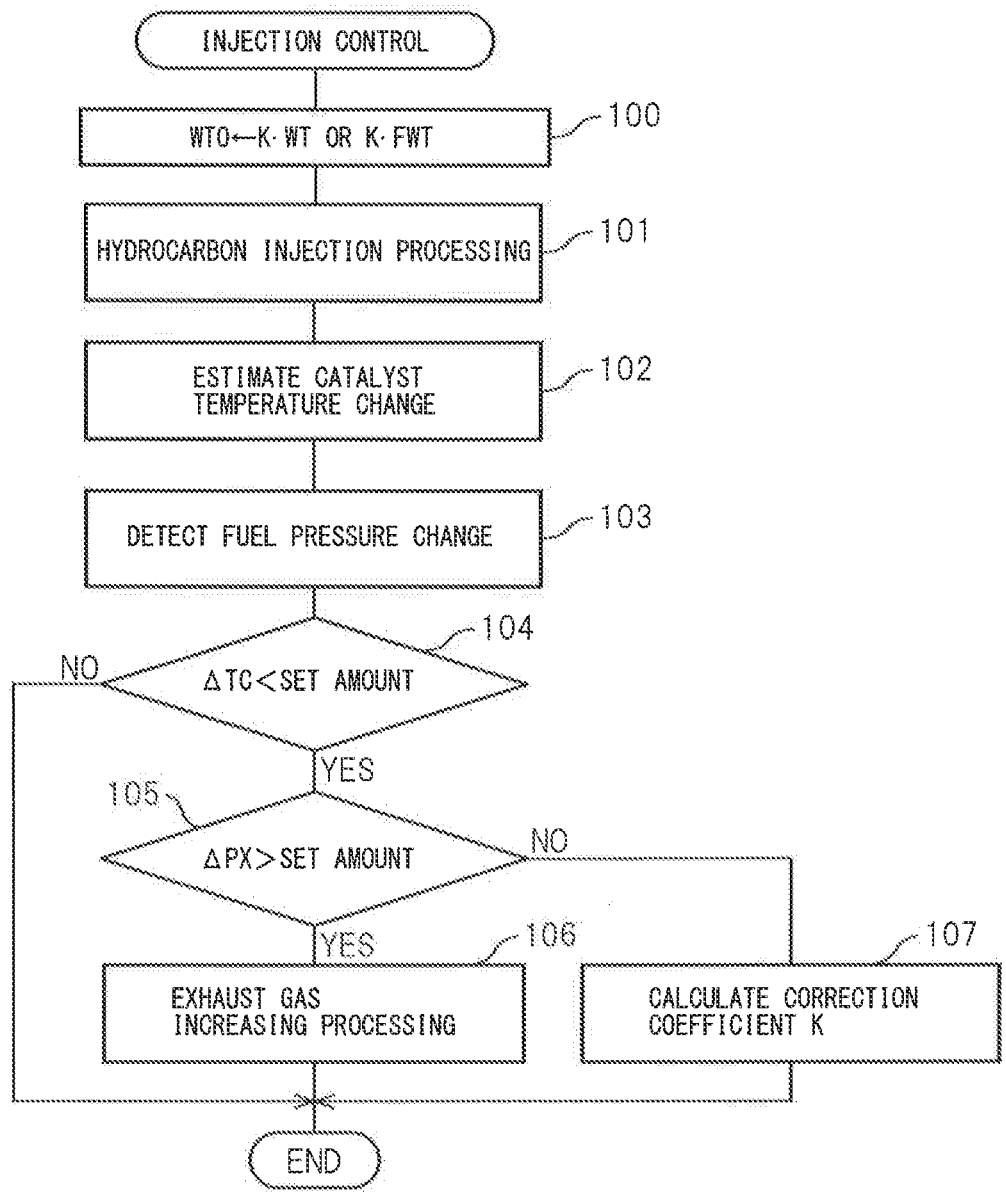
FIG. 20 is a flow chart for performing an injection control.

FIG. 20 shows another embodiment of the injection control routine. In this embodiment, when the possibility of the hydrocarbon feed valve 15 clogging is extremely high, an increase correction for increasing the amount of hydrocarbons fed from the hydrocarbon feed valve 15 is performed. Explaining this slightly more specifically, in this embodiment, the injection amount WTO of hydrocarbons from the hydrocarbon feed valve 15 is made a value (=K·WT or K·FWT) which is obtained by multiplying the injection amount WT shown in FIG. 11A or the injection amount FT shown in FIG. 17A with the correction coefficient K(≥1.0). Furthermore, in this embodiment, when the drop ΔPX of the fuel pressure PX of the fuel which is fed to the hydrocarbon feed valve 15 becomes smaller when hydrocarbons are injected from the hydrocarbon feed valve 15, the correction coefficient K is made greater the smaller the drop ΔPX of the feed fuel pressure PX. For example, when hydrocarbons are injected from the hydrocarbon feed valve 15, if the drop ΔPX of the fuel pressure PX of the fuel which is fed to the hydrocarbon feed valve 15, as shown in FIG. 15, is decreased from drop ΔPX1 where the hydrocarbon feed valve 15 is not clogged to the drop ΔPX2, the correction coefficient K is made K=ΔPX1/ΔPX2.

On the other hand, in this embodiment, when it is judged that the injection path 69 is clogged by the deposits 71, an exhaust gas amount increasing action which increases an amount of exhaust gas is performed so that the flow of exhaust gas blows of the deposits 71. In this case, the amount of exhaust gas which is exhausted from the engine increases the higher the engine load and increases the smaller the opening degree of the FOR control valve 17 is made, that is, the more the amount of recirculation of the exhaust gas is decreased. Therefore, in this embodiment according to the present invention, the amount of exhaust gas is increased by decreasing the amount of recirculation of the exhaust gas. In this case, preferably, at the time of engine high load operation, the EGR control valve 17 is closed to make the recirculation action of the exhaust gas stop so as to increase the amount of exhaust gas.

FIG. 20 shows an injection control routine for working this invention. This routine is executed by interruption every fixed time period.

Referring to FIG. 20, first, at step 100, the amount of injection WTO of hydrocarbons from the hydrocarbon feed valve 15 (=K·WT or K·FWT) is calculated by multiplying the injection amount NT shown in FIG. 11A or the in action amount FWT shown in FIG. 17A with the correction coefficient K. That is, when the injection amount WT shown in FIG. 11A is used as the injection amount WTO of the hydrocarbons from the hydrocarbon feed valve 15, the injection amount WT shown in FIG. 11A is multiplied with the correction coefficient K (=K·WT) while when the injection amount FWT shown in FIG. 17A is used as the injection amount WTO of the hydrocarbons from the hydrocarbon feed valve 15, the injection amount FWT shown in FIG. 17A is multiplied with the correction coefficient K (=K·FWT).

At step 101, hydrocarbons are injected from the hydrocarbon feed valve 15 by the injection amount WTO which is calculated at step 100, and the NO$_X$ removal action by the first NO$_X$ removal method is performed. Next, at step 102, the change of the catalyst bed temperature TC of the exhaust purification catalyst 13 is estimated. This catalyst bed temperature TC can be estimated using a model and can be estimated from the output value of the temperature sensor 23. Next, at step 103, the change of the fuel pressure PX of the fuel which is fed to the hydrocarbon feed valve 15 is detected by the fuel pressure sensor 66.

Next, at step 104, it is judged if the temperature rise ΔTC of the exhaust purification catalyst 13 due to the hydrocarbons which are fed from the hydrocarbon feed valve 15 is smaller than a predetermined set amount. In this case, the predetermined set amount for the temperature rise ΔTC is, for example, made a temperature rise corresponding to 80 percent of the preset temperature rise ΔTC1. When the temperature rise ΔTC of the exhaust purification catalyst 13 due to the hydrocarbons which are fed from the hydrocarbon feed valve 15 is smaller than the predetermined set amount, the routine proceeds to step 105 where it is judged if the drop ΔPX of the feed fuel pressure PX to the hydrocarbon feed valve 15 when hydrocarbons are injected from the hydrocarbon feed valve 15 is larger than a predetermined set amount. In this case, the predetermined set amount for the drop ΔPX of the feed fuel pressure PX is, for example, made a fuel pressure drop corresponding to 80 percent of the drop ΔPX1 of the feed fuel pressure PX when the hydrocarbon feed valve 15 is clogged.

When at step 105 it is judged that the drop ΔPX of the feed fuel pressure PX to the hydrocarbon feed valve 15 when hydrocarbons are injected from the hydrocarbon feed valve 15 is larger than the predetermined set amount, it is judged that the injection path 69 is clogged, then the routine proceeds to step 106 where the exhaust gas amount increasing action which increases an amount of exhaust gas is performed. As opposed to this, when at step 105 it is judged that the drop ΔPX of the feed fuel pressure PX to the hydrocarbon feed valve 15 when hydrocarbons are injected from the hydrocarbon feed valve 15 is smaller than the predetermined set amount, it is judged that the hydrocarbon feed valve 15 is clogged, then the routine proceeds to step 107 where the correction coefficient K is calculated. That is, the increase correction for increasing the amount of hydrocarbons fed from the hydrocarbon feed valve 15 is performed.

FIG. 21 shows an embodiment designed to detect the drop ΔPX of the fuel pressure PX of the fuel which is fed to the hydrocarbon feed valve 15 before performing the temperature raising control when an instruction is issued to perform regeneration control of the particulate filter 14. Note that, when the pressure difference before and after the particulate filter 14 which is detected by the differential pressure sensor 24 is over a predetermined set pressure, an instruction is issued to perform regeneration control of the particulate filter 14. When an instruction is issued to perform regeneration control of the particulate filter 14, the regeneration control which is shown in FIG. 21 is performed. This regeneration control routine is performed by interruption every fixed time period.

Referring to FIG. 21, first, at step 110, it is judged if the detection of the drop ΔPX of the fuel pressure PX of the fuel which is fed to the hydrocarbon feed valve 15 has been completed. When the detection of the drop ΔPX of the fuel pressure PX of the fuel which is fed to the hydrocarbon feed valve 15 has not been completed, the routine proceeds to step 111 where the injection amount WTO (=K·WT) of hydrocarbons from the hydrocarbon feed valve 15 is calculated by multiplying the injection amount WT shown in FIG. 11A with the correction coefficient K. Next, at step 112, hydrocarbons are injected from the hydrocarbon feed valve 15 by the injection amount WTO which is calculated at step 111, and the $NO_X$ removal action by the first $NO_X$ removal method is performed. Next, at step 113, it is judged if the steady state of the engine has been continuing for a certain time or more, that is, if the steady state of the engine is stable. When the steady state of the engine is stable, the routine proceeds to step 114.

At step 114, the chance of the fuel pressure PX of the fuel which is fed to the hydrocarbon feed valve 15 is detected by the fuel pressure sensor 66. Next, at step 115, it is judged if the drop $\Delta PX$ of the feed fuel pressure PX to the hydrocarbon feed valve 15 when hydrocarbons are injected from the hydrocarbon feed valve 15 is smaller than a predetermined set amount. In this case, the predetermined set amount for the drop $\Delta PX$ of the feed fuel pressure PX is for example made a fuel pressure drop corresponding to 80 percent of the drop $\Delta PX1$ of the feed fuel pressure PX when the hydrocarbon feed valve 15 is not clogged. When at step 115 it is judged that the drop $\Delta PX$ of the feed fuel pressure PX to the hydrocarbon feed valve 15 when hydrocarbons are injected from the hydrocarbon feed valve 15 is smaller than the predetermined set amount, it is judged that the hydrocarbon feed valve 15 is clogged, then the routine proceeds to step 116 where the correction coefficient K is calculated. That is, the increase correction for increasing the amount of hydrocarbons fed from the hydrocarbon feed valve 15 is performed.

When the detection of the drop $\Delta PX$ of the fuel pressure PX of the fuel which is fed to the hydrocarbon feed valve 15 has been completed, the routine proceeds from step 110 to step 117 where the injection amount WTO (=K·FWT) of hydrocarbons from the hydrocarbon feed valve 15 is calculated by multiplying the injection amount FWT shown in FIG. 17A with the correction coefficient K. Next, at step 118, hydrocarbons are injected from the hydrocarbon feed valve 15 by the injection amount WTO which is calculated at step 117 and the temperature raising control of the exhaust purification catalyst 13 is started. Next, at step 119, the change in the catalyst bed temperature TC of the exhaust purification catalyst 13 is estimated. This catalyst bed temperature TC can be estimated using a model and can also be estimated from the output value of the temperature sensor 23. Next, at step 120, it is judged if the temperature raising action of the exhaust purification catalyst 13 has been completed. When the temperature raising action of the exhaust purification catalyst 13 has been completed, the routine proceeds to step 121.

At step 121, it is judged if the temperature rise $\Delta TC$ of the exhaust purification catalyst 13 due to the hydrocarbons which are fed from the hydrocarbon feed valve 15 is smaller than a predetermined set amount. In this case, the predetermined set amount for the temperature rise $\Delta TC$ is, for example, made a temperature rise corresponding to 80 percent of the temperature rise temperature rise $\Delta TC1$ found in advance. When the temperature rise $\Delta TC$ of the exhaust purification catalyst 13 due to the hydrocarbons which are fed from the hydrocarbon feed valve 15 is smaller than the predetermined set amount, the routine proceeds to step 122 where it is judged if the correction coefficient K is larger than the set value $K_0$, that is, if the hydrocarbon feed valve 15 is clogged. When the correction coefficient K is not larger than the set value $K_0$, that is, when the hydrocarbon feed valve 15 is not clogged, the routine proceeds to step 123 where the exhaust gas amount increasing action which increases an amount of exhaust gas is performed.

In the embodiment which is shown in FIG. 21, when in the operating region which is shown in FIG. 16 by A, the drop of the fuel pressure of fuel fed to the hydrocarbon feed valve 15 is detected, and when the temperature raising control is being performed, the temperature rise of the exhaust purification catalyst 13 is detected. On the other hand, as explained above, when the temperature raising control of the exhaust purification catalyst 13 is performed, compared with the time of the operating region which is shown in FIG. 16 by A, the amount of hydrocarbons which are injected from the hydrocarbon feed valve 15 per unit time is made to increase. Therefore, the amount of feed of hydrocarbons per unit time when detecting the temperature rise of the exhaust purification catalyst 13 is made larger than the amount of feed of hydrocarbons per unit time when detecting the drop of the fuel pressure of fuel fed to the hydrocarbon feed valve 15. Further, in the embodiment which is shown in FIG. 21, when the amount of feed of hydrocarbons per unit time from the hydrocarbon feed valve 15 is made to increase so as to regenerate the particulate filter 14, the temperature rise of the exhaust purification catalyst 13 is detected.

Note that, as another embodiment, it is also possible to arrange an oxidation catalyst for reforming hydrocarbons upstream of the exhaust purification catalyst 13 in the engine exhaust passage.

REFERENCE SIGNS LIST 4 intake manifold
5 exhaust manifold
7 exhaust turbocharger
12 exhaust pipe
13 exhaust purification catalyst
14 particulate filter
15 hydrocarbon feed valve

The invention claimed is:

1. A control system of an internal combustion engine comprising:
    an exhaust purification catalyst arranged in an engine exhaust passage,
    a hydrocarbon feed valve arranged in the engine exhaust passage upstream of the exhaust purification catalyst,
    a fuel feed device for feeding fuel to the hydrocarbon feed valve, hydrocarbons being injected from the hydrocarbon feed valve into an exhaust gas along a predetermined injection path, fuel pressure of fuel which is fed to the hydrocarbon feed valve falling when hydrocarbons are injected from the hydrocarbon feed valve,
    a temperature sensor configured to detect a temperature rise of the exhaust purification catalyst,
    a pressure sensor configured to detect the fuel pressure of fuel fed to the hydrocarbon feed valve, and
    an electronic control unit configured to determine that the infection path is clogged when a temperature rise of the exhaust purification catalyst due to the hydrocarbons fed from the hydrocarbon feed valve is smaller than a predetermined rise and a drop of the fuel pressure of fuel fed to the hydrocarbon feed valve is larger than a predetermined drop.

2. The control system of an internal combustion engine as claimed in claim 1, wherein the electronic control unit is configured to perform an exhaust gas amount increasing action which increasing an amount of exhaust gas when the temperature rise of the exhaust purification catalyst due to the hydrocarbons fed from the hydrocarbon feed valve is smaller than the predetermined rise and the drop of the fuel pressure of fuel fed to the hydrocarbon feed valve is larger than the predetermined drop.

3. The control system of an internal combustion engine as claimed in claim 2, wherein an exhaust gas recirculation system for recirculating the exhaust gas into an engine intake passage is provided, and the amount of exhaust gas is increased by decreasing the amount of recirculation of the exhaust gas.

4. The control system of an internal combustion engine as claimed in claim 1, wherein the electronic control unit is configured to determine that the hydrocarbon feed valve is clogged when the temperature rise of the exhaust purification catalyst due to the hydrocarbons fed from the hydrocarbon feed valve is smaller than the predetermined rise and the drop of the fuel pressure of fuel fed to the hydrocarbon feed valve is smaller than the predetermined drop.

5. The control system of an internal combustion engine as claimed in claim 4 wherein the electronic control unit is configured to perform an increase correction for increasing the amount of hydrocarbons fed from the hydrocarbon feed valve when the temperature rise of the exhaust purification catalyst due to the hydrocarbons fed from the hydrocarbon feed valve is smaller than the predetermined rise and the drop of the fuel pressure of fuel fed to the hydrocarbon feed valve is smaller than the predetermined drop.

6. A control system of an internal combustion engine comprising:
an exhaust purification catalyst arranged in an engine exhaust passage,
a hydrocarbon feed valve arranged in the engine exhaust passage upstream of the exhaust purification catalyst,
a fuel feed device for feeding fuel to the hydrocarbon feed valve, hydrocarbons being injected from the hydrocarbon feed valve into an exhaust gas along a predetermined injection path, fuel pressure of fuel which is fed to the hydrocarbon feed valve falling when hydrocarbons are injected from the hydrocarbon feed valve,
a temperature sensor configured to detect a temperature rise of the exhaust purification catalyst,
a pressure sensor configured to detect the fuel pressure of fuel fed to the hydrocarbon feed valve, and
an electronic control unit configured to determine that the injection path is clogged when a temperature rise of the exhaust purification catalyst due to the hydrocarbons fed from the hydrocarbon feed valve is smaller than a predetermined rise and a drop of the fuel pressure of fuel fed to the hydrocarbon feed valve is smaller than a predetermined drop.

7. The control system of an internal combustion engine as claimed in claim 6 wherein the electronic control unit is configured to perform an increase correction for increasing the amount of hydrocarbons fed from the hydrocarbon feed valve when the temperature rise of the exhaust purification catalyst due to the hydrocarbons fed from the hydrocarbon feed valve is smaller than the predetermined rise and the drop of the fuel pressure of fuel fed to the hydrocarbon feed valve is smaller than the predetermined drop.

8. The control system of an internal combustion engine as claimed in claim 1 or 6 wherein the amount of feed of hydrocarbons per unit time when detecting the temperature rise of the exhaust purification catalyst is made larger compared with the amount of feed of hydrocarbons per unit time when detecting the drop of the fuel pressure of fuel fed to the hydrocarbon feed valve.

9. The control system of an internal combustion engine as claimed in claim 8 wherein precious metal catalysts are carried on exhaust gas flow surfaces of the exhaust purification catalyst, basic exhaust gas flow surface parts are formed around the precious metal catalysts, the exhaust purification catalyst has a property of reducing $NO_X$ which is contained in the exhaust gas if making a concentration of hydrocarbons flowing into the exhaust purification catalyst vibrate within a predetermined range of amplitude and within a predetermined range of period and has a property of being increased in storage amount of $NO_X$ which is contained in the exhaust gas if making a vibration period of the hydrocarbon concentration longer than the predetermined range, and the drop of the fuel pressure of fuel fed to the hydrocarbon feed valve is detected when the injection amount and injection period of the hydrocarbons from the hydrocarbon feed value are controlled so that the concentration of hydrocarbons flowing into the exhaust purification catalyst vibrates within said predetermined range of amplitude and within said predetermined range of period, an amount of feed of hydrocarbons per unit time being made to increase when detecting the temperature rise of the exhaust purification catalyst.

10. The control system of an internal combustion engine as claimed in claim 9 wherein a particulate filter is arranged in the engine exhaust passage downstream of the exhaust purification catalyst and the temperature rise of the exhaust purification catalyst is detected when the amount of feed of hydrocarbons per unit time from the hydrocarbon feed valve is made to increase for regenerating the particulate filter.

* * * * *